US009548483B2

(12) United States Patent
Umehara

(10) Patent No.: US 9,548,483 B2
(45) Date of Patent: Jan. 17, 2017

(54) SECONDARY BATTERY, AND ELECTRODE SHEET CUTTING APPARATUS

(75) Inventor: Masakazu Umehara, Toyota (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 645 days.

(21) Appl. No.: 13/981,673

(22) PCT Filed: Jan. 28, 2011

(86) PCT No.: PCT/JP2011/051764
§ 371 (c)(1),
(2), (4) Date: Jul. 25, 2013

(87) PCT Pub. No.: WO2012/101816
PCT Pub. Date: Aug. 2, 2012

(65) Prior Publication Data
US 2013/0309566 A1  Nov. 21, 2013

(51) Int. Cl.
*H01M 4/02* (2006.01)
*H01M 2/16* (2006.01)
(Continued)

(52) U.S. Cl.
CPC .......... *H01M 2/168* (2013.01); *H01M 2/1673* (2013.01); *H01M 4/04* (2013.01);
(Continued)

(58) Field of Classification Search
CPC .... H01M 4/13; H01M 4/622; H01M 10/0525; H01M 2/168; H01M 2/1673; H01M 4/0404; H01M 4/139; H01M 4/366; Y02E 60/122; Y02T 10/7011; Y10T 29/49108; Y10T 29/53139; Y02P 70/54
(Continued)

(56) References Cited

U.S. PATENT DOCUMENTS

2006/0016308 A1  1/2006  Katai et al.
2006/0194116 A1  8/2006  Suzuki et al.
(Continued)

FOREIGN PATENT DOCUMENTS

CN  1788371   6/2006
JP  61195563 A * 8/1986
(Continued)

*Primary Examiner* — Gary Harris
(74) *Attorney, Agent, or Firm* — Finnegan, Henderson, Farabow, Garrett & Dunner, LLP

(57) ABSTRACT

A secondary battery 100 comprises a positive electrode current collector 221 and a positive electrode active material layer 223 applied on the positive electrode current collector 221 and containing at least a positive electrode active material. The lithium-ion secondary battery 100 further comprises a negative electrode current collector 241 provided so as to oppose the positive electrode current collector 221 and a negative electrode active material layer 243 applied on the negative electrode current collector 241 and containing at least a negative electrode active material. The lithium-ion secondary battery 100 is also formed with a porous insulating layer 245 which contains stacked resin particles having insulating properties and is formed so as to cover at least one of the positive electrode active material layer 223 and the negative electrode active material layer 243 (in this case, negative electrode active material layer 243). The lithium-ion secondary battery 100 further comprises, on the edge of the insulating layer 245, a molten part 246 where the resin particles are melted.

6 Claims, 18 Drawing Sheets

(51) Int. Cl.
*H01M 4/13* (2010.01)
*H01M 4/62* (2006.01)
*H01M 10/0525* (2010.01)
*H01M 4/04* (2006.01)
*H01M 4/139* (2010.01)
*H01M 4/36* (2006.01)

(52) U.S. Cl.
CPC ........... *H01M 4/0404* (2013.01); *H01M 4/13* (2013.01); *H01M 4/139* (2013.01); *H01M 4/366* (2013.01); *H01M 4/622* (2013.01); *H01M 10/0525* (2013.01); *Y02E 60/122* (2013.01); *Y02P 70/54* (2015.11); *Y02T 10/7011* (2013.01); *Y10T 29/49108* (2015.01); *Y10T 29/53139* (2015.01)

(58) Field of Classification Search
USPC ........................................................ 429/211
See application file for complete search history.

(56) References Cited

U.S. PATENT DOCUMENTS

| | | |
|---|---|---|
| 2007/0042270 A1 | 2/2007 | Ohata et al. |
| 2011/0003209 A1 | 1/2011 | Katayama et al. |

FOREIGN PATENT DOCUMENTS

| | | | |
|---|---|---|---|
| JP | 6-36801 | | 2/1994 |
| JP | 11-138327 | | 5/1999 |
| JP | 11-339783 | | 12/1999 |
| JP | 2006-7404 | | 1/2006 |
| JP | 2010-157521 | | 7/2010 |
| JP | 2010-170770 | | 8/2010 |
| JP | 2011-18637 | | 1/2011 |
| JP | 2011018637 A | * | 1/2011 |
| KR | 2006-0036406 | | 4/2006 |
| WO | WO 2005/029614 | | 3/2005 |
| WO | WO 2005/078828 A1 | | 8/2005 |

* cited by examiner

SECONDARY BATTERY, AND ELECTRODE SHEET CUTTING APPARATUS

CROSS-REFERENCE TO RELATED APPLICATIONS

This application is a national phase application of International Application No. PCT/JP2011/051764, filed Jan. 28, 2011, the content of which is incorporated herein by reference.

TECHNICAL FIELD

The present invention relates to a secondary battery and an electrode sheet cutting apparatus.

The term "secondary batteries" as used herein refers to general rechargeable electric storage devices and encompasses so-called storage cells such as lithium-ion secondary batteries, nickel hydride batteries, nickel cadmium batteries and the like and storage devices such as electric double layer capacitors and the like.

The term "lithium-ion secondary batteries" as used herein refers to secondary batteries which utilize lithium ions as electrolyte ions and are charged and discharged by transfer of electrons accompanying lithium ions between positive and negative electrodes. The batteries generally referred to as "lithium secondary batteries" are encompassed by the lithium ion secondary batteries as used herein.

BACKGROUND ART

Regarding such secondary batteries, Patent Literature 1, for example, discloses a secondary battery comprising a porous electron insulating layer adhered to the surface of at least one electrode selected from the positive electrode and the negative electrode. The porous electron insulating layer contains a fine particle filler and a resin binding agent and the fine particle filler is a particle containing a particle with indefinite shape in which a plurality of primary particles are linked and bonded. As the fine particle tiller, titanium oxide (titania), aluminium oxide (alumina), zirconium oxide (zirconia) and tungsten oxide are mentioned.

Patent Literature 2 discloses a non-aqueous electrolyte secondary battery having, on the surface of the positive electrode and/or the negative electrode, a porous separator material for separating the positive electrode and the negative electrode. The separator material contains a cross-linked resin and has sufficient strength and resistance to a non-aqueous electrolyte. As the cross-linked resin, crosslinked materials are mentioned such as at least one resin selected from the group consisting of polyethylenes (PEs), polypropylenes (PPs), copolymerized polyolefins, polyolefin derivatives (chlorinated polyethylenes and the like), styrene-butadiene copolymers, acryl resins [polyalkyl(meth)acrylates and derivatives thereof such as polymethylmethacrylate, polymethylacrylate and the like], polyalkylene oxides [polyethylene oxide (PEO) and the like], fluororesins [polyvinylidene fluoride (PVDF) and the like] and derivatives thereof, urea resins, polyurethanes, epoxy resins, unsaturated polyester resins, polyamide-imides, polyimides and the like.

Patent Literature 2 also discloses the separator material which may contain various inorganic fine particles far improvement of the strength thereof. The inorganic fine particles include, but not limited to as far as they are electrochemically stable and have electrical insulating properties, oxide powder such as iron oxide, $SiO_2$ (silica), $Al_2O_3$ (alumina), $TiO_2$, $BaTiO_3$ and the like; nitride powder such as aluminium nitride, silicon nitride and the like; covalent crystal powder such as silicone, diamond and the like; sparingly soluble ionic crystal powder such as barium sulfate, calcium fluoride, barium fluoride and the like; montmorillonite and the like.

Patent Literature 2 also discloses the separator material which contains fine particles melting at 80 to 150° C. such as polyolefin fine particles for conferring shut down behavior on a battery. As a resin forming such fine particles, for example particles of PEs, copolymerized polyolefins, polyolefin derivatives (chlorinated polyethylenes and the like), polyolefin wax, petroleum wax, carnauba wax are mentioned. Exemplified copolymerized polyolefins include ethylene-vinyl monomer copolymers, more specifically ethylene-vinyl acetate copolymers (EVA), ethylene-acrylic acid copolymers (ethylene-methyl acrylate copolymers, ethylene-ethyl acrylate copolymers and the like) and the like.

Patent Literature 3 discloses formation of a sheet-shaped electrode containing an active material-containing layer formed on a current collector by mixing an electrode active material and a binder to prepare an application solution for electrode formation, applying the application solution on the current collector and then drying the application solution. It also discloses the sheet-shaped electrode which is then extended by applying pressure and cut into a predetermined dimension. Patent Literature 3 proposes a slitter device which allows sufficient prevention of melt-adhesion of scrapings from the current collector onto the side of an upper blade upon cutting of the sheet-shaped electrode and allows sufficient prevention of generation of burrs on a cutting plane of the current collector.

CITATION LIST

Patent Literature

Patent Literature 1: WO 05/078828
Patent Literature 2: Japanese Patent Application Publication No. 2010-170770
Patent Literature 3: Japanese Patent Application Publication No. 2006-7404

SUMMARY OF INVENTION

Technical Problem

The present inventor envisages stacking, as an insulating layer, insulating resin particles, for example, a polyethylene on an active material layer in the positive or negative electrode. The present inventor also envisages an electrode which is obtained by cutting a current collecting foil containing the thus formed active material layer and insulating layer into a predetermined dimension so as to laminate the insulating layer onto the active material layer. The present inventor envisages bonding of resin particles with, for example, a binder in the insulating layer.

The present inventor further envisages the production steps which comprises preparing a mother sheet of a current collector having a broad width and forming the active material layer and the insulating layer in this order followed by cutting into a predetermined dimension. On this occasion, bonding between resin particles may be released and the insulating layer may be partially detached when the insulating layer as such is cut.

In addition, not only in the production phase, when the insulating layer has exposed edges of stacked resin particles at the edges of the electrode sheet, the insulating layer may be easily detached at these edges, causing generation of foreign substances in secondary batteries.

Solution to Problem

The secondary battery according to an aspect of the present invention comprises a positive electrode current collector; a positive electrode active material layer retained on the positive electrode current collector and containing at least a positive electrode active material; a negative electrode current collector provided so as to oppose the positive electrode current collector; and a negative electrode active material layer retained on the negative electrode current collector and containing at least a negative electrode active material. The secondary battery comprises a porous insulating layer which contains stacked resin particles having insulating properties and is formed so as to cover at least one of the positive electrode active material layer and the negative electrode active material layer. The insulating layer has, on an edge thereof, a molten part where the resin particles are melted.

In the secondary battery the insulating layer has the molten part where the resin particles are melted on the edge thereof and thus has a robust edge. This allows prevention of loss of resin particles and detachment of the insulating layer. The edge of the insulating layer may have a cut trace. The insulating layer may be stacked on the negative electrode active material layer. The insulating layer covering the positive electrode active material layer may inhibit release of an electrolyte involved in the battery reactions from the positive electrode active material layer. Because of this, the insulating layer may preferably be stacked on the negative electrode active material layer.

For example, the insulating layer may contain an inorganic filler or rubber particles having insulating properties. In addition, for example, the negative electrode active material layer may have a broader width than the positive electrode active material layer and is provided so as to oppose the positive electrode active material layer, and the insulating layer may be stacked on the negative electrode active material layer on the side opposing the positive electrode active material layer. In this case, because the negative electrode active material layer has a broader width than the positive electrode active material layer, the negative electrode active material layer can face the positive electrode active material layer even when the edge of the insulating layer stacked on the negative electrode active material layer is melted and thus the function of the positive electrode active material layer is not inhibited.

The method for producing the secondary battery according to the present invention comprises a step of preparing an electrode sheet, a step of melting an insulating layer and a step of cutting the electrode sheet. Specifically, in the step of preparing the electrode sheet, the electrode sheet is prepared which includes a current collector; an active material layer formed on the current collector and containing an electrode active material; and a porous insulating layer Which contains stacked resin particles having insulating properties and is formed so as to cover the active material layer. Next, in the step of melting, the insulating layer is melted along a predetermined line. In the step of cutting, the electrode sheet is cut along the line where the insulating layer is melted in the step of melting. According to this method for producing the secondary battery, the insulating layer is melted at the position where the electrode sheet is cut prior to cutting of the same. Therefore the insulating layer is prevented from partial detachment thereof in the step of cutting.

In the method for producing the secondary battery, for example in the step of melting, the insulating layer may be melted by irradiating a laser onto the insulating layer. The part where the insulating layer is melted has less space where, for example, an electrolyte can pass through. Therefore it is believed that this part may inhibit the action of an active material layer which otherwise substantially contributes to the battery reactions. However, when, in the step of melting, the insulating layer is melted by irradiation of the laser, the width where the insulating layer is melted can be appropriately controlled so as to be narrow. Therefore the extent of inhibition of the action of the active material layer can be lowered. A preferable mode of the laser is, for example, a $CO_2$ laser. A $CO_2$ laser has the wavelength (approximately 10.6 μm) of which energy is easily absorbed by resins (e.g. polyethylenes). Thus a $CO_2$ laser is suitable for melting resin particles and can effectively melt resin particles. Between the step of melting and the step of cutting may be provided the step of cooling the electrode sheet. Accordingly the solidification of the resin melted in the step of melting can be further ensured before the step of cutting, resulting in shorter takt time between the step of melting and the step of cutting.

An electrode sheet cutting apparatus comprises a heater provided so as to heat an electrode sheet along a predetermined line and a cutter provided so as to cut the electrode sheet heated by the heater, along the line. In this case, for example when the electrode sheet is cut which contains an active material layer formed on a current collector and an insulating layer containing stacked resin particles formed on the active material layer, the insulating layer can be cut after melting thereof.

In this case, the heater may be, for example, a laser apparatus which irradiates a laser onto the electrode sheet. The laser may be, for example, as $CO_2$ laser. The electrode sheet cutting apparatus may comprise a conveying device for conveying the electrode sheet along a predetermined conveyance route. In this case where the heater and the cutter are fixed along the conveyance route, a position adjustment mechanism may be provided which adjusts the position of the electrode sheet relative to the heater and the cutter.

The electrode sheet may be a strip-shaped sheet, and the conveying device may continuously convey the electrode sheet along the conveyance route. In this case, the conveying device may include a plurality of guide rolls which support and convey the electrode sheet. The heater may be provided so that the electrode sheet is heated at a position downstream, in the conveyance direction, of the position where the guide rolls support the electrode sheet. This allows prevention of adhesion of the molten resin on the guide rolls. In this case, the heater may be provided within 1 mm to 10 mm downstream, in the conveyance direction, of the position where the guide rolls support the electrode sheet.

A cooling device may also be provided which cools the electrode sheet after heating by the heater and before cutting by the cutter. This allows reduction in takt time. In this case, the cooling device may be a fan which blows air to the electrode sheet. The cooling device may include a metal roll to be pressed to the electrode sheet and a cooling member for cooling the metal roll.

DESCRIPTION OF EMBODIMENTS

The secondary battery and the method for producing the secondary battery according to an embodiment of the present invention are described hereinafter referring to the figures. The members and parts having same functions are appropriately designated by the same symbols. All figures are schematically depicted and do not always reflect the real matters.

<<Configuration of Lithium-ion Secondary Battery 100>>

Figure 1:
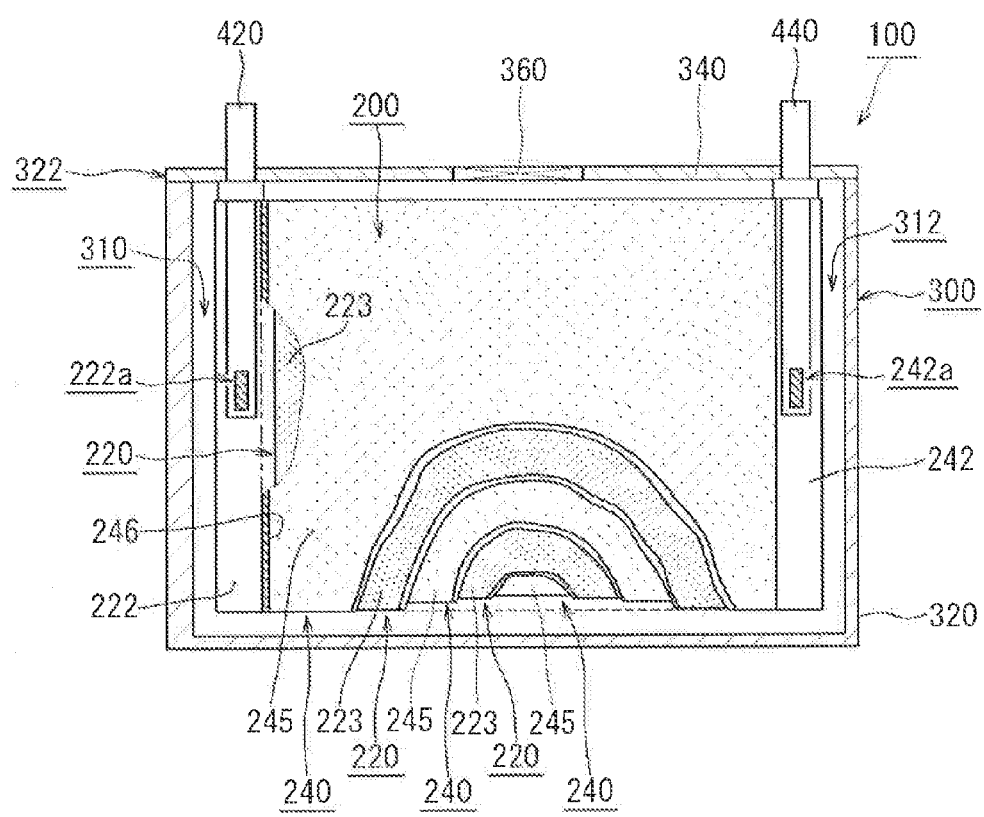
FIG. 1 is a view showing an example of the configuration of a lithium-ion secondary battery.
Figure 2:
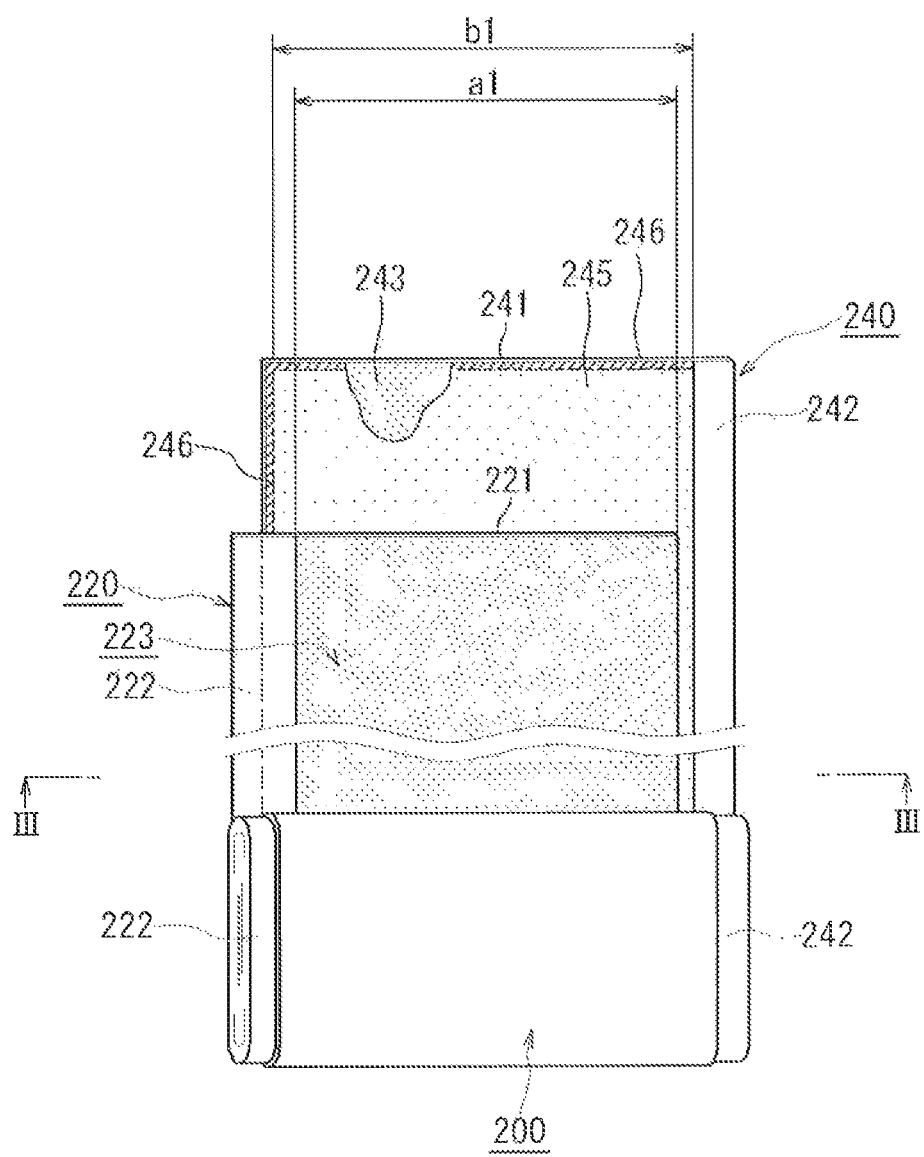
FIG. 2 is a view showing a wound electrode assembly of a lithium-ion secondary battery.
Figure 3:
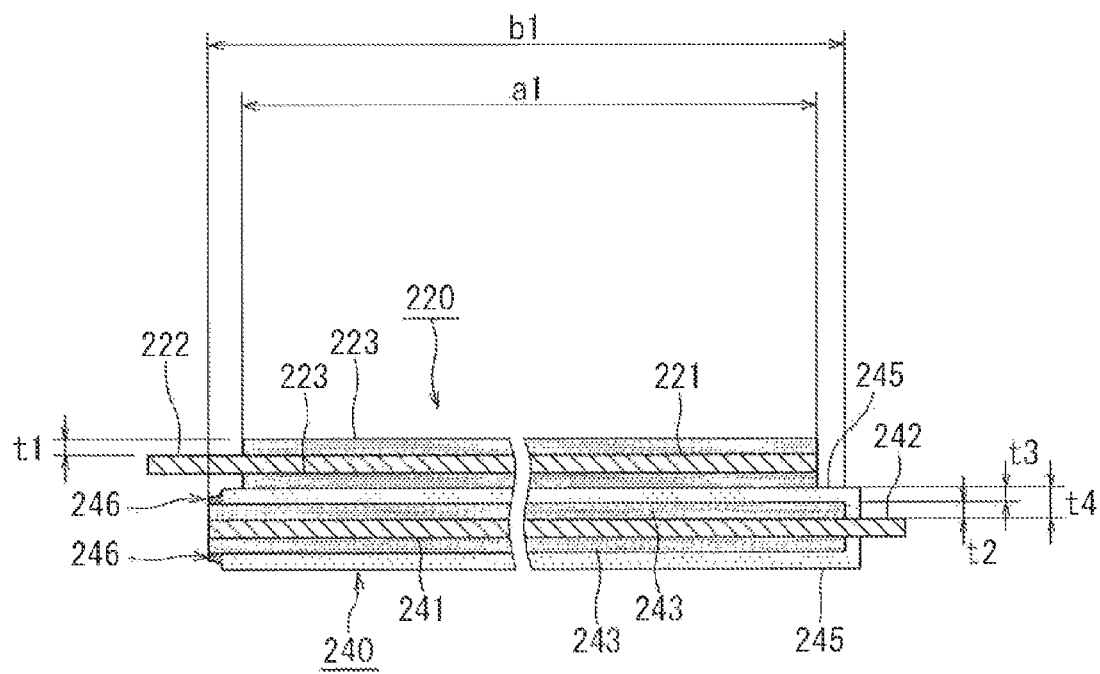
FIG. 3 is a section view showing the section along III-III of FIG. 2.

FIG. 1 shows a lithium-ion secondary battery 100 which is the secondary battery according to one embodiment of the present invention. The lithium-ion secondary battery 100 comprises, as shown in FIG. 1, a wound electrode assembly 200, a battery case 300 and an electrolyte (not shown). FIG. 2 is a view showing the wound electrode assembly 200. FIG. 3 shows the section along III-III of FIG. 2. In this embodiment, the wound electrode assembly 200 contains, as shown in FIG. 2, a strip-shaped positive electrode sheet 220 and a strip-shaped negative electrode sheet 240 which are stacked together and wound.

<<Positive Electrode Sheet 220>>

The positive electrode sheet 220 comprises a positive electrode current collector 221 and a positive electrode active material layer 223. The positive electrode current collector 221 may suitably contain a metal foil suitable for positive electrodes. In this embodiment, the positive electrode current collector 221 contains a strip-shaped aluminium foil having a predetermined width and a thickness of approximately 10 μm. The positive electrode active material layer 223 is retained on the positive electrode current collector 221 and contains at least a positive electrode active material. In this embodiment, the positive electrode active material layer 223 is a layer obtained by applying a positive electrode mixture containing the positive electrode active material on the positive electrode current collector 221. In this embodiment, an uncoated part 222 is defined along the edge on one side in the width direction of the positive electrode current collector 221. The positive electrode active material layer 223 is formed on both surfaces of the positive electrode current collector 221 except for the uncoated part 222 defined on the positive electrode current collector 221.

<<Positive Electrode Active Material>>

The positive electrode active material contained in the positive electrode active material layer 223 may be a material used for positive electrode active materials of lithium-ion secondary batteries. Examples of the positive electrode active material include lithium transition metal oxides such as $LiNiCoMnO_2$ (lithium nickel cobalt manganese composite oxide), $LiNiO_2$ (lithium nickel oxide), $LiCoO_2$ (lithium cobalt oxide), $LiMn_2O_4$ (lithium manganese oxide), $LiFePO_4$ (lithium iron phosphate) and the like. $LiMn_2O_4$ has, for example, the spinel structure. $LiNiO_2$ and $LiCoO_2$ have the laminar rock salt structure. $LiFePO_4$ has, for example, the olivine structure. $LiFePO_4$ having the olivine structure may include, for example, particles of the order of nanometers. $LiFePO_4$ having the olivine structure may be covered by a carbon film.

<<Conducting Material>>

The positive electrode active material layer 223 may contain, in addition to the positive electrode active material, optional components such as a conducting material, a binder (binding agent) and the like, if necessary. The conducting material may be exemplified by, for example, carbon materials such as carbon powder, carbon fiber and the like, from which one single type or two or more types in combination may be used as the conducting material. Carbon powder may be various carbon black (e.g., acetylene black, oil furnace black, graphitized carbon black, carbon black, graphite, ketjen black), graphite powder and the like.

<<Binder, Thickener, Solvent>>

The binder may be a polymer soluble or dispersible in the solvent used. For example, in a positive electrode mixture containing an aqueous solvent, water-soluble or water-dispersible polymers may be preferably used including cellulose polymers such as carboxymethylcellulose (CMC), hydroxypropyl methylcellulose (HPMC) and the like (e.g. polyvinyl alcohol (PVA), polytetrafluoroethylene (PTFE) etc.), fluororesins such as tetrafluoroethylene-hexafluoropropylene copolymers (FEPs) and the like (e.g. vinyl acetate copolymers, styrene butadiene rubbers (SBRs) etc.), rubbers such as acrylic acid-modified SBR resins (SBR latexes) and the like. In a positive electrode mixture containing a non-aqueous solvent, polymers such as polyvinylidene fluoride (PVDF), polyvinylidene chloride (PVDC) and the like may be preferably used. The exemplified polymer materials may be used for, in addition to providing the function as a binder, providing the function as a thickener or other additives to the composition. Any aqueous and non-aqueous solvents can be used as the solvent. A suitable non-aqueous solvent may be exemplified by N-methyl-2-pyrroridone (NMP).

<<Thickness of Positive Electrode Active Material Layer 223>>

In this embodiment, the positive electrode active material layer 223 has an average thickness t1 of about 27 μm per side. The thickness t1 of the positive electrode active material layer 223 may be measured with reference to, for example, the uncoated part 222 of the positive electrode sheet 220.

<<Negative Electrode Sheet 240>>

The negative electrode sheet 240 comprises a negative electrode current collector 241, a negative electrode active material layer 243 and an insulating layer 245. The negative electrode current collector 241 may suitably contain a metal foil suitable for negative electrodes. In this embodiment, the negative electrode current collector 241 contains a strip-shaped copper foil having a predetermined width and a thickness of approximately 10 μm. The negative electrode active material layer 243 is retained on the negative electrode current collector 241 and contains at least a negative electrode active material. In this embodiment, the negative electrode active material layer 243 is a layer obtained by applying a negative electrode mixture containing the negative electrode active material on the negative electrode current collector 241. An uncoated part 242 is defined along the edge on one side in the width direction of the negative electrode current collector 241. The negative electrode active material layer 243 is formed on both surfaces of the negative electrode current collector 241 except for the uncoated part 242 defined on the negative electrode current collector 241.

<<Negative Electrode Active Material>>

The negative electrode active material contained in the negative electrode active material layer 243 may contain, without limitation, one or two or more materials which are conventionally used for lithium-ion secondary batteries. The negative electrode active material may include, for example, particulate carbon materials (carbon particles) at least partially having a graphite structure (laminar structure). More specifically, so-called graphite, hard carbon, soft carbon and combined carbon materials thereof can be used. For example, graphite particles such as natural graphite can be used. The negative electrode mixture contains an appropriate amount of a thickener in order to maintain dispersion of the negative electrode active material. The negative electrode mixture may contain the same thickener, binder and conducting material which are used for the positive electrode mixture.

<<Thickness of Negative Electrode Active Material Layer 243>>

In this embodiment, the negative electrode active material layer 243 has the average thickness t2 of about 35 μm per side. The thickness t2 of the negative electrode active material layer 243 may be measured, for example, with reference to the uncoated part 242 of the negative electrode sheet 240 after the formation of the negative electrode active material layer 243.

<<Insulating Layer 245>>

The insulating layer 245 is, in this embodiment, a porous layer which contains stacked resin particles having insulating properties and is formed so as to cover the negative electrode active material layer. The resin particles used for the insulating layer 245 are suitably thermoplastic resin particles and may be, for example, polyethylenes, polypropylenes, copolymerized polyolefins containing 85 mol % or more structural units derived from ethylene or polyolefin derivatives. The resin particles may be a mixture of more than one type of thermoplastic resin particles at suitable proportions. The resin particles may also contain a material having insulating properties such as inorganic fillers, rubbers and the like at a suitable proportion. In this embodiment, the resin particles are a polyethylene. The resin particles may be bonded with, for example a binder. The binder may be the same binder as those used for positive electrode active material layers or negative electrode active material layers.

The particle diameter of the resin particles may be such that suitable gaps are formed between stacked particles in order to form a porous layer sufficiently allowing distribution of an electrolyte. Thus the particle diameter of the resin particles is, for example, about 1 μm to 10 μm and more preferably about 1 μm to 3 μm. The particle diameter herein is the median diameter (d50) which can be determined from the particle size distribution measured with a particle size distribution analyzer based on the light scattering method.

<<Thickness of Insulating Layer 245>>

In this embodiment, the insulating layer 245 has an average thickness t3 of about 25 μm per side. The thickness t3 of the insulating layer 245 may be measured, for example, by measuring the total thickness t4 of the negative electrode active material layer 243 and the insulating layer 245 with reference to the uncoated part 242 of the negative electrode sheet 240 after formation of the insulating layer 245 and calculating according to the difference (t3=t4−t2) from the thickness t2 of the negative electrode active material layer 243 described above.

The insulating layer 245 contains, as described above, the resin particles which are stacked. When the inner temperature of the battery is abnormally increased, the resin particles are melted at a predetermined temperature and form a film on the surface of the negative electrode active material layer 243 in order to block the distribution of the electrolyte. This can lower the reactions in the battery (this function is appropriately referred to as "shut down").

<<Molten Part 246>>

In this embodiment, the insulating layer 245 contains a molten part 246 on its edge. The molten part 246 is a part where the resin particles forming the insulating layer 245 are melted. According to the lithium-ion secondary battery 100, the molten part 246 which contains molten resin particle is formed on the edge of the insulating layer 245 and thus the insulating layer 245 has the robust and solidified edge, making it difficult for the insulating layer 245 being detached at the edge. In the examples she in FIGS. 2 and 3, the negative electrode active material layer 243 has the width hi (not including the molten part 246) which is slightly broader that the width al of the positive electrode active material layer 223.

<<Wound Electrode Assembly 200>>

In this example, the positive electrode sheet 220 and the negative electrode sheet 240 are, as shown in FIG. 2, aligned in the length direction and stacked. On this occasion, the positive electrode active material layer 223 is stacked on the negative electrode active material layer 243. The uncoated part 222 of the positive electrode sheet 220 and the uncoated part 242 of the negative electrode sheet 240 are stacked so as to mutually protrude at the opposite ends along the width direction of the positive electrode sheet 220 and the negative electrode sheet 240. The negative electrode active material layer 243 has the width b1 slightly broader than the width a1 of the positive electrode active material layer 223 and is provided so as to cover the positive electrode active material layer 223. The stacked sheet material (e.g. positive electrode sheet 220) is wound around a winding axis defined in the width direction of the sheet material and the status such that the negative electrode active material layer 243 covers the positive electrode active material layer 223 is still maintained after winding. FIG. 2 shows the wound electrode assembly 200 partially expanded which is obtained by winding the positive electrode sheet 220 and the negative electrode sheet 240 and deforming so as to be flat.

In the wound electrode assembly 200, as shown in FIGS. 1 to 3, the positive electrode active material layer 223 and the negative electrode active material layer 243 are physically separated by the insulating layer 245 covering the negative electrode active material layer 243 and electrical insulation between the positive electrode active material layer 223 and the negative electrode active material layer 243 is maintained. In other words, the insulating layer 245 can act as as separator which physically and electrically separates the positive electrode active material layer 223 from the negative electrode active material layer 243 and allows transfer of the electrolyte. Because of this, in this embodiment, no additional separator is provided between the positive electrode sheet 220 and the negative electrode sheet 240.

<<Battery Case 300>>

In this example, the battery case 300 is, as shown in FIG. 1, a so-called rectangular battery case comprising a case body 320 and a lid 340. The case body 320 is square tubular with a bottom and is a flat box-shaped container with one side (upper side) being opened. The lid 340 is a member provided at an opening (opening on the upper side) of the case body 320 in order to close the opening.

Secondary batteries for vehicles are desired to have improved weight energy efficiency (battery capacity per unit weight) in order to improve the fuel consumption of vehicles. Therefore the case body 320 and the lid 340 of the battery case 300 in this embodiment are formed of a lightweight metal such as aluminum, aluminum alloy and the like. Accordingly the weight energy efficiency can be improved.

The battery case 300 has a flat rectangular inner space for harboring the wound electrode assembly 200. As shown in FIG. 1, the flat inner space of the battery case 300 has a horizontal width slightly broader than that of the wound electrode assembly 200. In this embodiment, the battery case 300 harbors the wound electrode assembly 200 in the inner space. The wound electrode assembly 200 is, as shown in FIG. 1, deformed so as to be flat in one direction perpendicular to the winding axis in order to be contained in the battery case 300.

In this embodiment, the battery case 300 comprises a square tubular case body 320 with a bottom and a lid 340 for closing an opening of the case body 320. The lid 340 of the battery case 300 is attached with electrode terminals 420 and 440. The electrode terminals 420 and 440 penetrate the battery case 300 (lid 340) to be exposed at the outside of the battery case 300. The lid 340 is also provided with a safety valve 360.

In this example, the battery case 300 (in this example, the lid 340) is attached with the electrode terminals 420 and 440. The wound electrode assembly 200 is attached to the electrode terminals 420 and 440. The wound electrode assembly 200 is pressed and bent to be flat in one direction perpendicular to the winding axis so as to be harbored in the battery case 300. The wound electrode assembly 200 also has, on both side thereof in the winding axis direction, the uncoated part 222 of the positive electrode sheet 220 and the uncoated part 242 of the negative electrode sheet 240 mutually protruding at the opposite sides. Among these, a first electrode terminal 420 is fixed at the uncoated part 222 of the positive electrode current collector 221 and a second electrode terminal 440 is fixed (e.g. by welding) at the uncoated part 242 of the negative electrode current collector 241.

The wound electrode assembly 200 is attached to the electrode terminals 420 and 440 fixed to the lid 340 while it is pressed and bent to be flat. This wound electrode assembly 200 is harbored in a flat inner space of the case body 320. The case body 320 harboring the wound electrode assembly 200 is closed with the lid 340. A joining part 322 (see FIG. 1) of the lid 340 and the case body 320 may be, for example, welded and sealed by laser welding. As described above, in this example, the wound electrode assembly 200 is positioned in the battery case 300 by means of the electrode terminals 420 and 440 fixed to the lid 340 (battery case 300).

<<Electrolyte>>

An electrolyte is then injected into the battery case 300 through a liquid injection pore provided on the lid 340. The electrolyte is so-called non-aqueous electrolyte which does not contain water as a solvent. In this example, the electrolyte contains $LiPF_6$ at a concentration of about 1 mol/liter in a mixed solvent of ethylene carbonate and diethyl carbonate (e.g. mixed solvent of about 1:1 volume ratio). The liquid injection pore is then attached with a metal sealing cap (e.g. by welding) in order to seal the battery case 300. The electrolyte is not limited to the above example and may be a non-aqueous electrolyte conventionally used for lithium-ion secondary batteries.

<<Voids>>

The positive electrode active material layer 223 contains fine gaps which may also be referred to as hollow spaces between, for example, the particles of the positive electrode active material and the conducting material. The electrolyte (not shown) can infiltrate into the fine gaps of the positive electrode active material layer 223. The negative electrode active material layer 243 contains fine gaps which may also be referred to as hollow spaces between, for example, particles of the negative electrode active material. The insulating layer 245 formed so as to cover the negative electrode active material layer 243 contains the stacked resin particles and contains fine gaps which may also be referred to as hollow spaces and to which the electrolyte can infiltrate. The gaps (hollow spaces) are herein appropriately referred to as "voids". As described above, the electrolyte infiltrates into the positive electrode active material layer 223 and the negative electrode active material layer 243 in the lithium-ion secondary battery 100.

<<Gas Evacuation Path>>

In this example, the flat inner space of the battery case 300 is slightly larger than the wound electrode assembly 200 deformed to be flat. The wound electrode assembly 200 is provided with on both sides thereof gaps 310 and 312 between the wound electrode assembly 200 and the battery ease 300, which serve as gas evacuation paths.

The lithium-ion secondary battery 100 having the above configuration has increased temperature when it is overcharged. When the lithium-ion secondary battery 100 has high temperature, the electrolyte is decomposed to produce gas. The produced gas is smoothly exhausted through the gaps 310 and 312 on both sides of the wound electrode assembly 200 and between the wound electrode assembly 200 and the battery case 300 as well as through the safety valve 360. In the lithium-ion secondary battery 100, the positive electrode current collector 221 and the negative electrode current collector 241 are electrically connected to external devices through the electrode terminals 420 and 440 penetrating the battery case 300. The behavior of the lithium-ion secondary battery 100 during charge and discharge is hereinbelow illustrated.

<<Behavior During Charge>>

Figure 4:
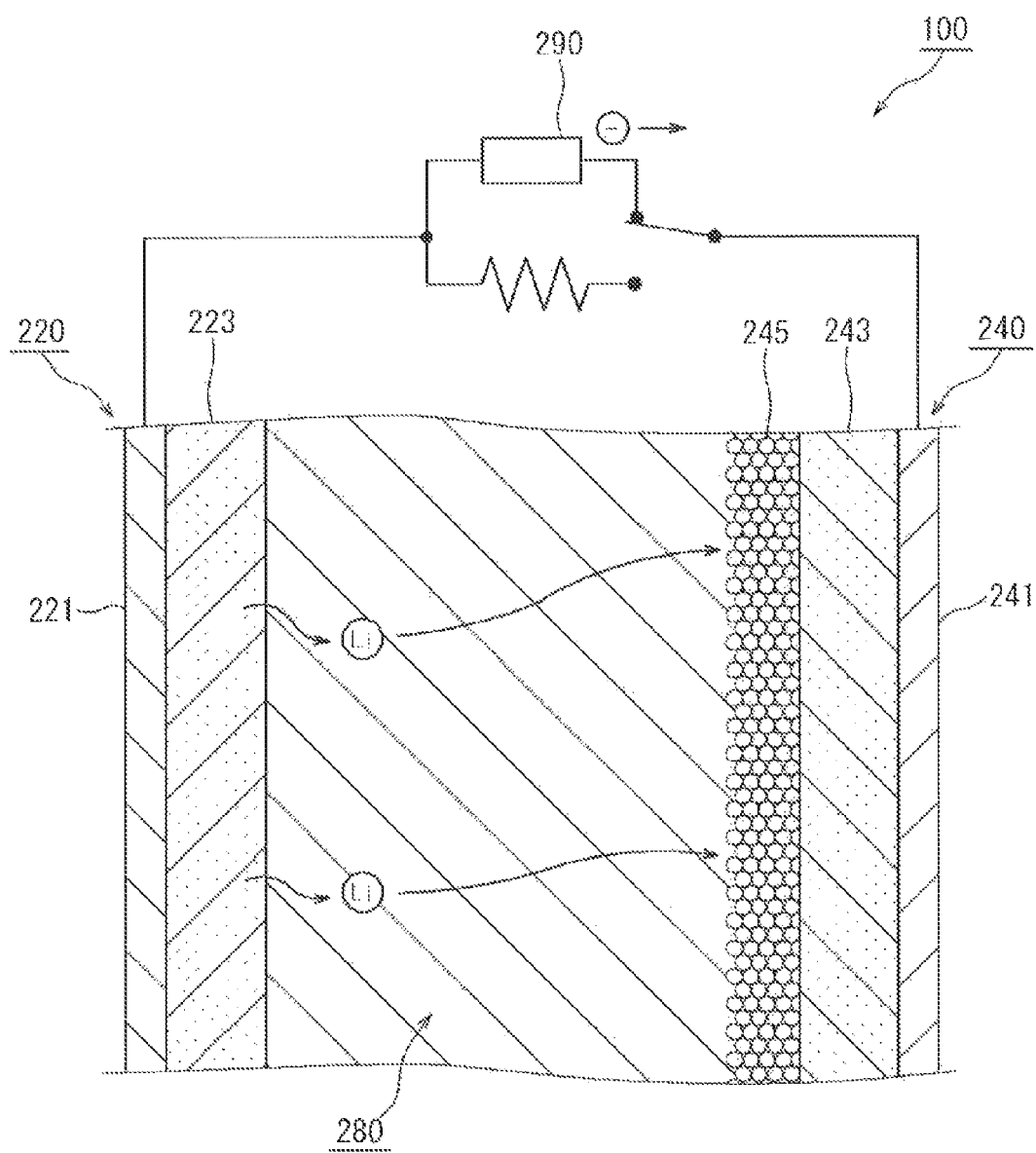
FIG. 4 is a view schematically showing the state of a lithium-ion secondary battery during charge.

FIG. 4 schematically shows the state of the lithium-ion secondary battery 100 during charge. During charge, as shown in FIG. 4, the electrode terminals 420 and 440 (see FIG. 1) of the lithium-ion secondary battery 100 are connected to a charger 290. Due to the action of the charger 290, lithium ions (Li) are released from the positive electrode active material in the positive electrode active material layer 223 to the electrolyte 280 during charge. Electrons are also released from the positive electrode active material layer 223. The released electrons are transported, as shown in FIG. 4, through the conducting material (not shown) to the positive electrode current collector 221 and further to the negative electrode 240 through the charger 290. In the negative electrode 240, electrons are stored and lithium ions (Li) in the electrolyte 280 are absorbed and stored in the negative electrode active material in the negative electrode active material layer 243.

<<Behavior During Discharge>>

Figure 5:
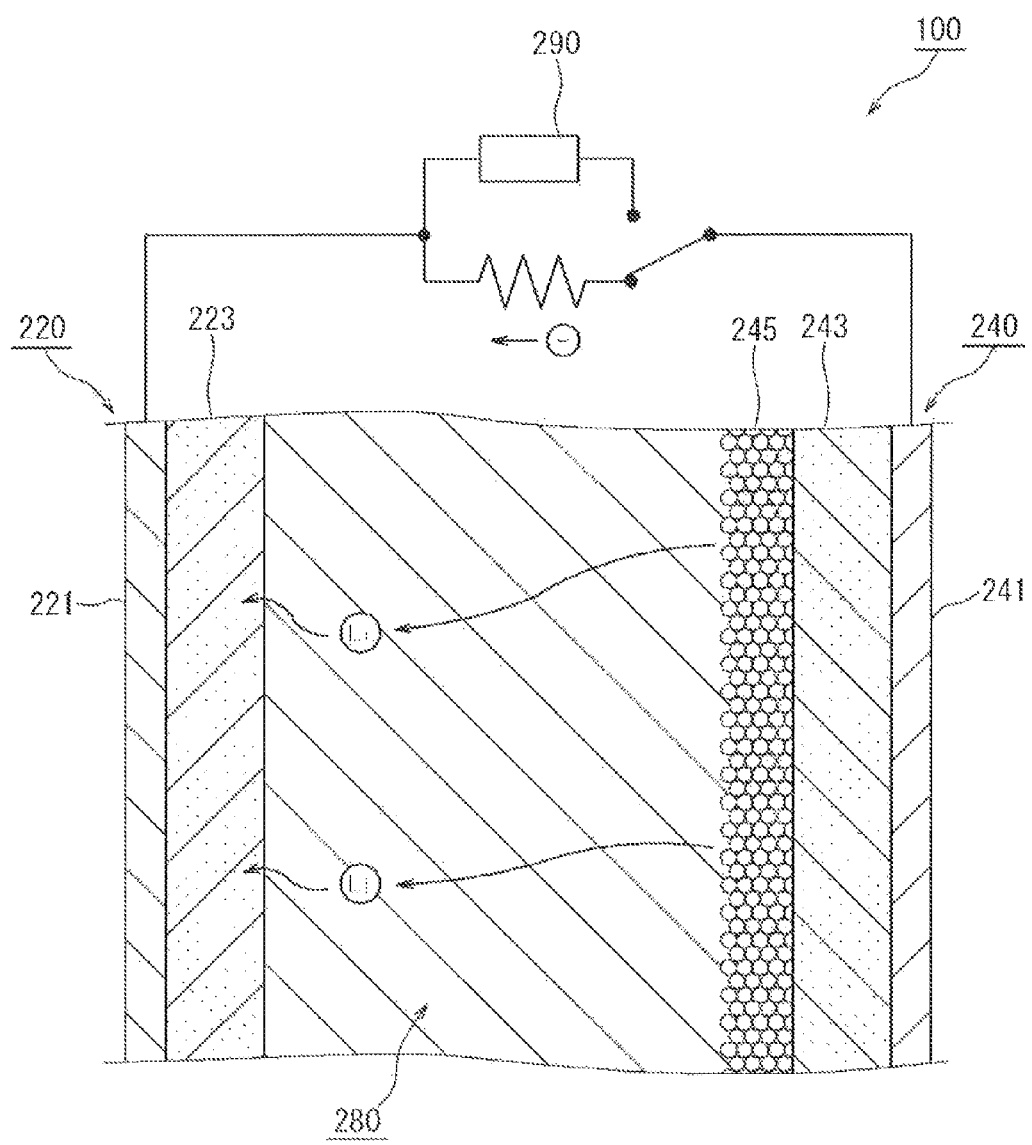
FIG. 5 is a view schematically showing the state of a lithium-ion secondary battery during discharge.

FIG. 5 schematically shows the state of the lithium-ion secondary battery 100 during discharge. During discharge, as shown in FIG. 5, electrons are transported from the negative electrode 240 to the positive electrode 220 while lithium ions (Li ions) stored in the negative electrode active material layer 243 are released into the electrolyte 280. In the positive electrode, lithium ions (Li) in the electrolyte 280 are incorporated into the positive electrode active material in the positive electrode active material layer 223.

As described above, during charge and discharge of the lithium-ion secondary battery 100, lithium ions (Li) are transferred back and forth between the positive electrode active material layer 223 and the negative electrode active material layer 243 via the electrolyte 280. During charge, electrons are transported to the positive electrode current collector 221 from the positive electrode active material via the conducting material. On the other hand, during discharge, electrons are transported back to the positive electrode active material from the positive electrode current collector 221 via the conducting material.

<<Lithium-ion Secondary Battery 100>>

As described above, the lithium-ion secondary battery 100 comprises as shown in FIGS. 1 and 2 the positive electrode current collector 221 and the positive electrode active material layer 223 applied on the positive electrode current collector 221 and containing at least the positive electrode active material. The lithium-ion secondary battery 100 further comprises the negative electrode current collector 241 provided so as to oppose the positive electrode current collector 221 and the negative electrode active material layer 243 applied on the negative electrode current collector 241 and containing at least the negative electrode active material. The lithium-ion secondary battery 100 also comprises, as shown in FIG. 3, the porous insulating layer 245 containing the stacked resin particles having insulating properties formed so as to cover at least one of the positive electrode active material layer 223 and the negative electrode active material layer 243 (in the example shown in FIG. 3, the negative electrode active material layer 243). The lithium-ion secondary battery 100 also comprises the insulating layer 245 which has the molten part 246 on the edge thereof where the resin particles are melted.

In such a lithium-ion secondary battery 100, the positive electrode active material layer 223 and the negative electrode active material layer 243 are physically separated by the insulating layer 245 covering the negative electrode active material layer 243. The insulating layer 245 also maintains electric insulation between the positive electrode active material layer 223 and the negative electrode active material layer 243. The insulating layer 245 also allows distribution of the electrolyte 280 between the positive electrode active material layer 223 and the negative electrode active material layer 243. In the insulating layer 245, a film is also formed by melting the resin particles at a predetermined temperature when the inner temperature of the battery is abnormally increased. The film blocks the distribution of the electrolyte and suppresses the battery reactions. The insulating layer 245 thus has so-called shut down function for suppressing the battery reactions when the inner temperature of the battery is abnormally increased.

Particularly, in this embodiment, no additional separator is provided between the positive electrode sheet 220 and the negative electrode sheet 240. Because of this, if the insulating layer 245 is partially detached, electrical insulation between the positive electrode active material layer 223 and the negative electrode active material layer 243 may not be maintained, resulting in loss of the function as a battery of the lithium-ion secondary battery 100.

However, in this lithium-ion secondary battery 100, the molten part 246 where the resin particles are melted is formed on the edge of the insulating layer 245. In the molten part 246, a portion of the molten resin particles binds to the negative electrode active material layer 243 and the surrounding resin particles. Thus the molten part 246 has a high bonding force to the negative electrode active material layer 243 and the insulating layer 245 excluding the molten part 246. Because the edge of the insulating layer 245 is robust, the insulating layer 245 also prevented from detachment thereof at the edge. Because the loss of the resin particles at the edge of the insulating layer 245 is also prevented, generation of foreign materials in the lithium-ion secondary battery 100 can be suppressed which is otherwise due to the loss of the resin particles at the edge of the insulating layer 245.

In this embodiment, the edge of the insulating layer 245 on the side where the uncoated part 242 of the negative electrode sheet 240 is provided is not melted but the edge of the insulating layer 245 excluding the above part is melted. The negative electrode sheet 240 may be cut at the position where the molten part 246 is formed in the process for producing the negative electrode sheet 240 described hereinbelow. The porous insulating layer 245 is formed by stacking the resin particles having insulating properties so as to cover the negative electrode active material layer 243. However, the porous insulating layer 245 obtained by such a simple formation process may cause loss of the resin particles, upon cutting of the negative electrode sheet 240, from the cutting site or detachment of the insulating layer 245 at the cutting site. Therefore when the negative electrode sheet 240 is cut which contains such an insulating layer 245, the resin particles in the insulating layer 245 may be melted before cutting the negative electrode sheet 240 at the cutting site. A method for producing a secondary battery according to one embodiment of the present invention is described hereinbelow.

<<Method for Producing Secondary Battery>>

Figure 6:
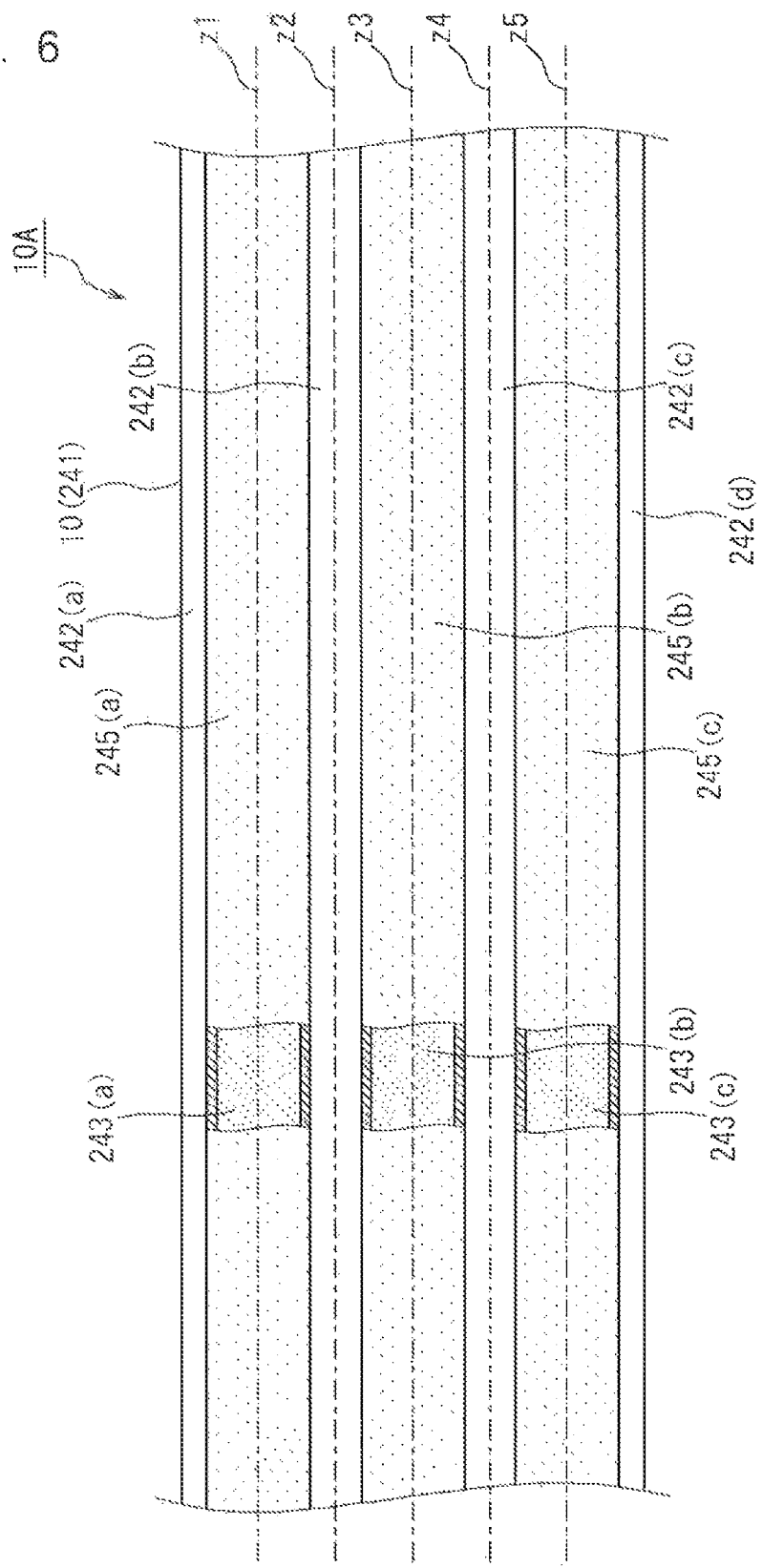
FIG. 6 is a plan view showing a current collector formed with an active material layer and an insulating layer in a secondary battery according to one embodiment of the present invention.

The method for producing a secondary battery and the electrode sheet cutting apparatus according to an embodiment of the present invention are described hereinafter. In this embodiment, the method for producing a secondary battery comprises a step of preparing an electrode sheet, a step of melting and a step of cutting. The method for producing a secondary battery may be applied, for example, to the step of producing the negative electrode sheet 240 of the lithium-ion secondary battery 100 (see FIG. 1) described above. The negative electrode sheet 240 of the lithium-ion secondary battery 100 is hereinafter exemplified in order to describe the method for producing a secondary battery and the electrode sheet cutting apparatus according to the embodiment of the present invention. FIG. 6 is a plan view of the electrode sheet (negative electrode sheet 240) prepared in the step of preparing the electrode sheet.

<<Step of Preparing Electrode Sheet>>

An electrode sheet 10A prepared in the step of preparing the electrode sheet comprises, as shown in FIG. 6, a current collector 10 (mother current collector of the negative electrode current collector 241), an active material layer (negative electrode active material layer 243) and an insulating layer (insulating layer 245). The electrode sheet 10A means a mother sheet from which a plurality of negative electrode sheets 240 is excised. The current collector 10 means a current collector from which a plurality of negative electrode current collectors 241 for the negative electrode sheets 240 is excised.

In this embodiment, the current collector 10 is a copper foil and the negative electrode active material layer 243 is formed on the negative electrode current collector 241. The insulating layer 245 covers the negative electrode active material layer 243 (active material layer) and contains stacked resin particles having insulating properties. The present inventor envisages obtaining a plurality of negative electrode sheets 240 from the current collector 10 (mother sheet) as shown in FIG. 6.

In the mode shown in FIG. 6, a plurality of rows (in the example shown in FIG. 6, three rows) of active material layers 243 (a) to (c) are applied on the strip-shaped current collector 10 (mother sheet) having a broad width. In the mode shown in FIG. 6, uncoated parts 242 (a) to (d) are also provided on both sides in the width direction of the current collector 10 (mother sheet) and between the active material layers 243 (a) to (c). The active material layers 243 (a) to (c) are applied along the length direction of the current collector 10 (mother sheet). In this embodiment, as shown in FIG. 6, the active material layers 243 (a) to (c) are further formed with insulating layers 245 (a) to (c), respectively. The insulating layers 245 (a) to (c) respectively cover the active material layers 243 (a) to (c). The alphabets in brackets following the symbols used herein are for discriminating more than one members or sites designated with these symbols.

For the active material layers 243 (a) to (c), for example, an electrode mixture is prepared by mixing the electrode active material (positive electrode active material, negative electrode active material), the conducting material, the binder, the thickener and the like described above in a solvent (step of preparing a mixture). The thus prepared electrode mixture in the step of preparing the mixture is applied on the current collector 10 (step of applying). In the step of applying, a conventionally well known appropriate applicator, for example, a gravure coater, a die coater, a comma coater, a slit coater and the like, may be used. In this embodiment, as shown in FIG. 6, the elongated strip-shaped current collector 10 (mother sheet) is used. Accordingly the electrode mixture may be continuously applied at predetermined positions on the current collector 10 while it is conveyed.

Next, the electrode mixture applied on the current collector 10 in the step of applying is dried (step of drying). In the step of drying, the current collector 10 may be conveyed to a drying furnace under controlled drying conditions. Appropriate drying conditions may be set in order to prevent migration in the electrode mixture. Next, the positive electrode active material layer 223 or the negative electrode active material layer 243 dried in the step of drying is pressed in the thickness direction (step of pressing and extending). In the step of pressing and extending, a conventionally well known roll press method, flat press method or the like may be appropriately employed. Accordingly certain active material layers 243 (a) to (c) can be formed on the current collector 10.

Figure 7:
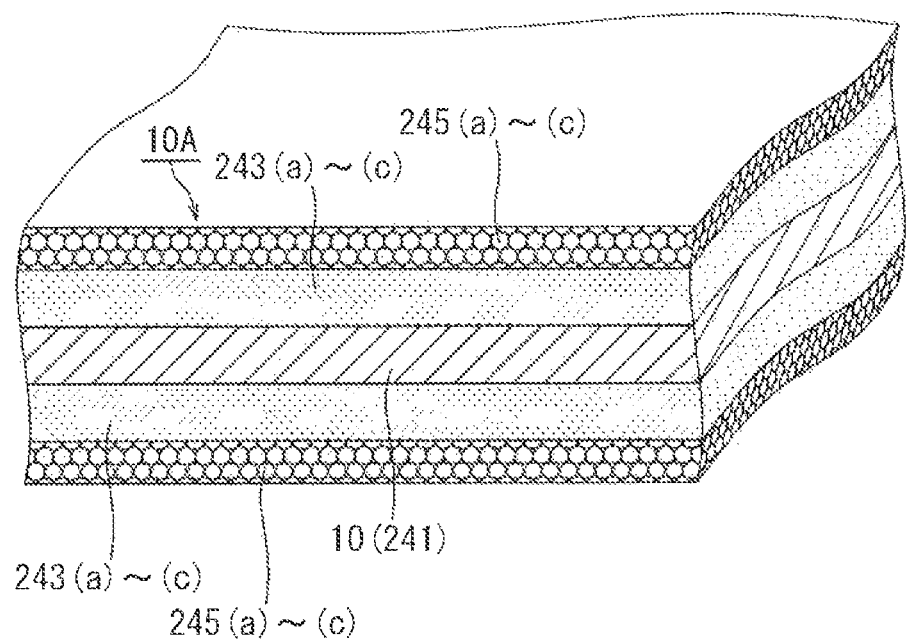
FIG. 7 is a section view of a negative electrode sheet in a secondary battery according to one embodiment of the present invention.

The insulating layers 245 (a) to (c) are formed so as to cover the active material layers 243 (a) to (c). The insulating layers 245 (a) to (c) are porous layers of stacked resin particles. The insulating layers 245 (a) to (c) may be prepared by, for example, preparing slurry containing the resin particles dispersed in a solvent and applying the slurry on the active material layers 243 (a) to (c) at predetermined thicknesses followed by drying. In the step of applying the slurry on the active material layers 243 (a) to (c) at predetermined thicknesses, the slurry may be applied by the gravure technique. The insulating layers 245 (a) to (c) may be extended by applying pressure so as to have desired thicknesses. FIG. 7 shows the section of the electrode sheet 10A formed by applying the active material layers 243 (a) to (c) and the insulating layers 245 (a) to (c). The electrode sheet 10A contains, as shown in FIG. 7, the current collector 10 on both sides of which the active material layers 243 (a) to (c) and the insulating layers 245 (a) to (c) are applied.

In this ease, cutting lines z1 to z5 are provided in the middle of the active material layers 243 (a) to (c) in the width direction and in the middle of the uncoated parts between the active material layers 243 (a) to (c). The current collector 10 (mother sheet) is cut along these cutting lines z1 to z5 to excise, in the width direction, a plurality of (six in the example shown in FIG. 6) electrode sheets (negative electrode sheets 240 (a) to (f) in this case) respectively having an uncoated part on one side in the width direction. The current collector 10 is exposed at the cutting lines z2 and z4 among others which are defined in the middle of the uncoated parts between the active material layers 243 (a) to (c), and thus may be simply cut by a cutter (which may be referred to as a slitter) at these lines.

On the other hand, the active material layers 243 (a) to (c) contain the insulating layers 245 (a) to (c) of the stacked resin particles formed so as to cover the active material layers 243 (a) to (c). This causes partial loss of the resin particles forming the insulating layers 245 (a) to (c) when the active material layers 243 (a) to (c) are simply cut by a cutter at the cutting lines z1, z3 and z5 that are defined in the middle of the width direction. The insulating layers 245 (a) to (c) may be partially detached in some cases. The step of melting is necessary when the active material layers 243 (a) to (c) onto which the insulating layers 245 (a) to (c) are formed are cut at the cutting lines z1, z3 and z5 that are defined in the middle of the width direction.

Figure 8:
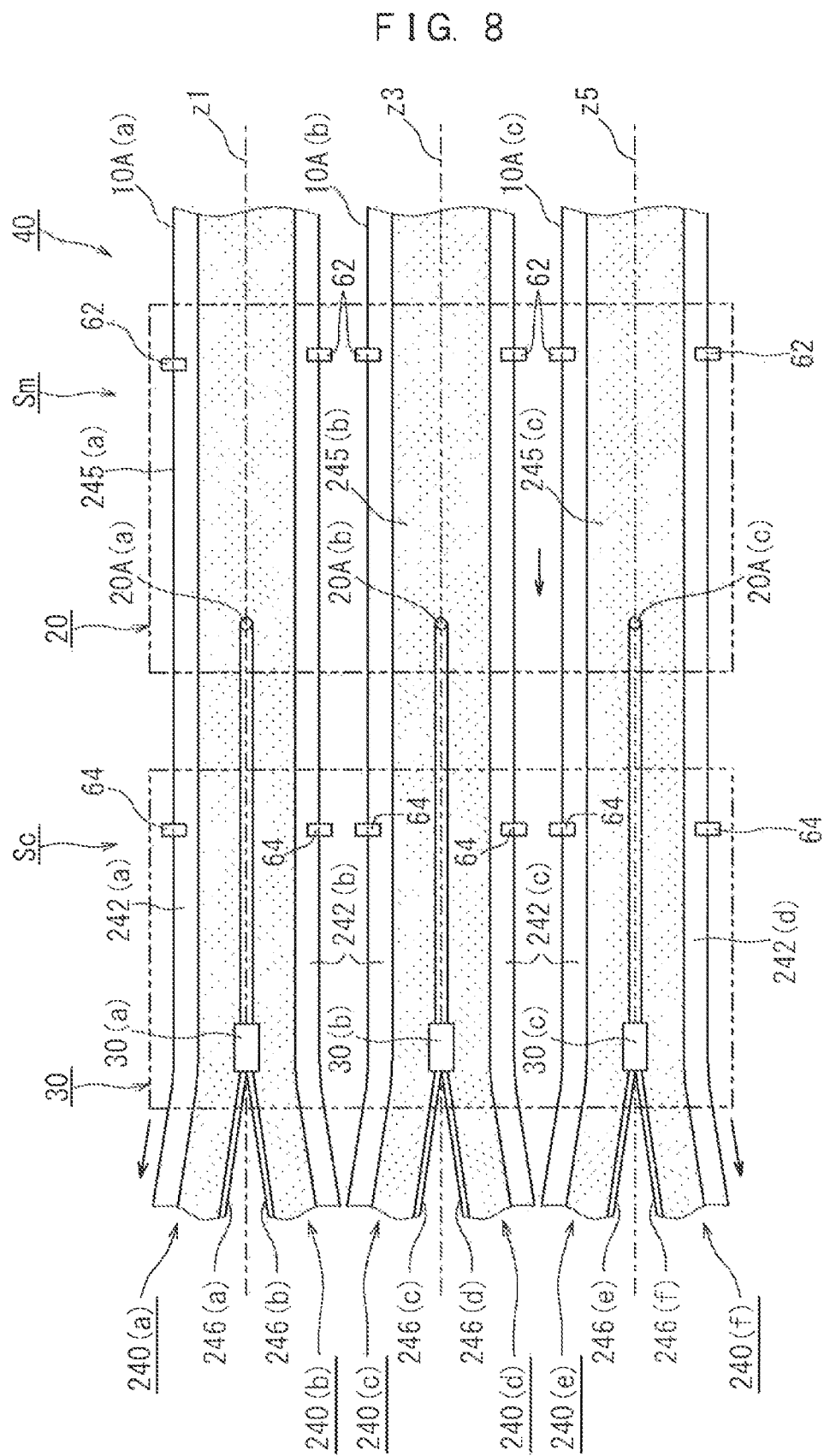
FIG. 8 is a plan view showing the step of melting and the step of cutting in a method for producing a secondary battery according to one embodiment of the present invention.

FIG. 8 is a plan view showing the step of melting and the step of cutting the insulating layer of the electrode sheet. In this embodiment, although it is not shown in the figures, the electrode sheet 10A is cut along the cutting lines z2 and z4 defined in the middle of the uncoated parts between the active material layers 243 (a) to (c). Thereafter, as shown in FIG. 8, the cut electrode sheets 10A (a) to (c) are supplied to the step of melting (S1) and the step of cutting (S2).

Figure 9:
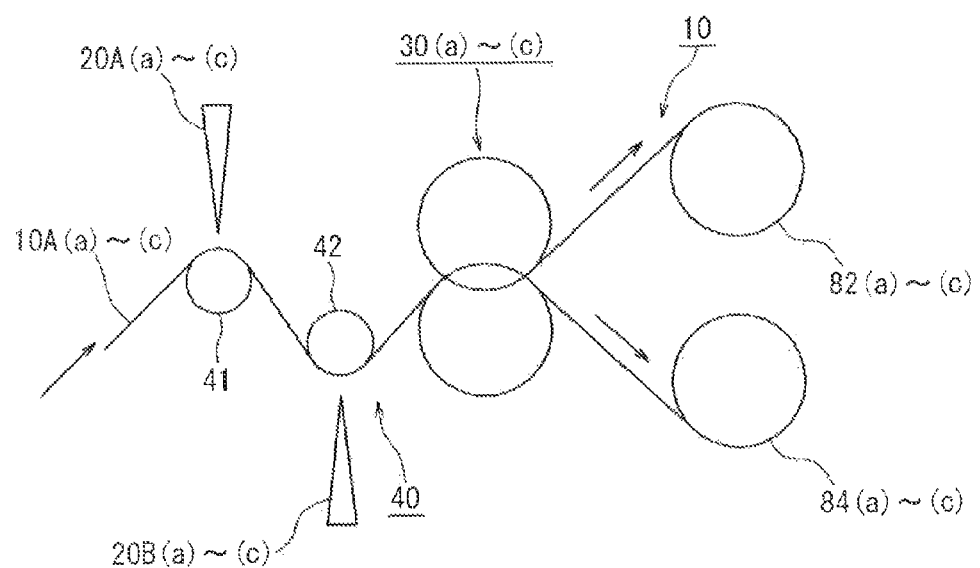
FIG. 9 is a side view showing a configuration example of an electrode sheet cutting apparatus according to one embodiment of the present invention.

In this embodiment, the electrode sheets 10A (a) to (c) are conveyed along a predetermined conveyance route by a conveying device 40 (see FIG. 9). A heater 20 and a cutter 30 are fixed in the conveyance route. In this embodiment, the electrode sheets 10A (a) to (c) are strip-shaped sheets and the conveying device 40 continuously conveys the electrode sheets 10A (a) to (c) along the conveyance route. In this embodiment, the conveying device 40 includes a plurality of guide rolls 41 and 42 (see FIG. 9) which support and convey the electrode sheets 10A (a) to (c).

<<Step of Melting (Sm)>>

In the step of melting, the insulating layers 245 (a) to (c) of the electrode sheets 10A (a) to (c) prepared in the step of preparing the electrode sheet are melted along the predetermined lines z1, z3 and z5.

In the step of melting, the insulating layers 245 (a) to (c) may be melted for the width that depends on the width which cutters 30 (a) to (c) cut the insulating layers 245 (a) to (c) in the step of cutting, e.g. the width of about 0.1 mm to 5.0 mm (e.g. the width of about 0.5 mm to 1.5 mm). Thus in this embodiment, the insulating layers 245 (a) to (c) are melted in the step of melting by irradiating lasers 20A (a) to (c) onto the insulating layers 245 (a) to (c). A laser is highly directional. In addition a laser allows adjustment of the melting width of the insulating layers 245 (a) to (c), for example, by adjusting the focal distance of the laser or output power (strength) of the laser. For example, the insulating layer 116 can be melted for the width of about 0.1 min to 5.0 mm. The laser also allows melting of the insulating layers 245 (a) to (c) without contacting to the electrode sheets 10A (a) to (c). Thus it hardly affects the active material layers 243 (a) to (c).

The laser in this case may preferably be a $CO_2$ laser. In this embodiment, the insulating layers 245 (a) to (c) contain polyethylene resin particles. In order to suitably melt such resin particles, the $CO_2$ laser may have the wavelength of, for example, approximately 10.6 μm and the output of 5 W to 25 W. A $CO_2$ laser has the wavelength of 10.6 μm of which energy may be easily absorbed by resins (e.g. polyethylenes). This $CO_2$ laser is suitable for melting resin particles and can effectively melt resin particles. Such a $CO_2$ laser can effectively provide heat to the resin particles forming the insulating layers 245 (a) to (c).

In this embodiment, the insulating layers 245 (a) to (c) are provided on both sides of the electrode sheets 10A (a) to (c) as described above. Therefore, as shown in FIG. 9, the electrode sheets 10A (a) to (c) are irradiated on both side with a laser so as to melt the insulating layers 245 (a) to (c) on both sides of the electrode sheets 10A (a) to (c). The insulating layer 245 is porous and contains many voids between resin particles. The insulating layer 245 becomes a film upon melting that contains almost no void. Therefore the insulating layer 245 has reduced volume at the molten part 246, resulting in decreased thickness of the insulating layer 245.

<<Disposition of Laser Device>>

In the example shown in FIG. 9, the insulating layers 245 (a) to (c) are irradiated with lasers 20A (a) to (c) which are formed on the opposite side of a back roll 41 while the electrode sheets 10A (a) to (c) are supported on the back roll 41 (guide roll). Accordingly the insulating layers 245 (a) to (c) are melted which are formed on the side where the lasers 20A (a) to (c) is irradiated (see FIG. 8). Next a back roll 42 supports the side where the insulating layers 245 (a) to (c) are melted. Then during the support by the back roll 42, the insulating layers 245 (a) to (c) are irradiated with lasers 20B (a) to (c) which are formed on the opposite side to the back roll 42. The symbols 20A (a) to (c) and 20B (a) to (c) directly illustrate the lasers that irradiate the electrode sheets 10A (a) to (c). The laser device generating such lasers is omitted from figures for convenience of illustration. The depicted lasers 20A (a) to (c) and lasers 20B (a) to (c) indirectly illustrate the laser device generating the lasers and a device controlling the laser device.

As described above, when the electrode sheets 10A (a) to (c) have the insulating layers 245 (a) to (c) on both sides, the insulating layers 245 (a) to (c) on both sides may be melted. In the example shown in FIG. 9, the electrode sheets 10A (a) to (c) are sequentially irradiated with, on both sides, lasers 20A (a) to (c) and lasers 20B (a) to (c) to melt the insulating layers 245 (a) to (c) on both sides. In the example shown in FIG. 9, the electrode sheets 10A (a) to (c) are irradiated with the lasers 20A (a) to (c) at the position of support by the back roll 41 (guide roll). At the position of support by the back roll 41 (guide roll), the electrode sheets 10A (a) to (c) are less floppy, so that the electrode sheets 10A (a) to (c) are irradiated with the lasers 20A (a) to (e) at a more appropriate position.

In the example shown in FIG. 9, the insulating layers 245 (a) to (c) are irradiated with the lasers 20A (a) to (c) and the lasers 20B (a) to (c) which are formed on the opposite side to the back rolls 41 and 42 at the positions where the back rolls 41 and 42 support the electrode sheets 10A (a) to (c). In this case, when the output power of the lasers 20A (a) to (c) and the lasers 20B (a) to (c) is extremely high, the insulating layers 245 (a) to (c) on the side of support by the back rolls 41 and 42 may also be melted. When the insulating layers 245 (a) to (c) on the side of support by the back rolls 41 and 42 are melted, the molten resin may adhere to the back rolls 41 and 42, causing troubles.

Thus, as shown in FIG. 9, when the electrode sheets 10A (a) to (c) are irradiated with the lasers 20A (a) to (c) and the lasers 20B (a) to (c) at the positions of support by the back rolls 41 and 42, it is necessary to adjust the output of the lasers 20B (a) to (c). In this case, the output of the lasers 20A (a) to (c) and the lasers 20B (a) to (c) may be adjusted so that the insulating layers 245 (a) to (c) on the side where they are directly irradiated with the lasers 20B (a) to (c) are melted but the molten resin does not adhere to the back rolls 41 and 42.

Figure 10:
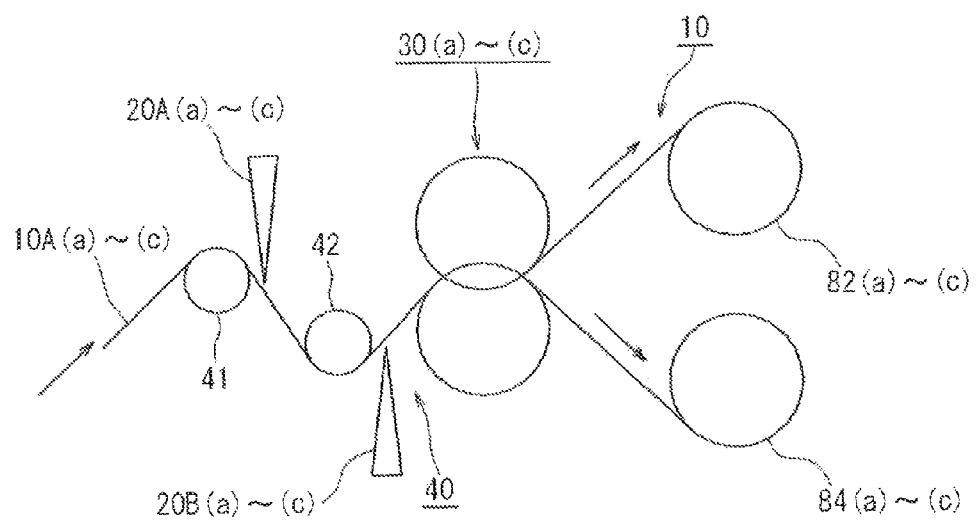
FIG. 10 is a side view showing a configuration example of an electrode sheet cutting apparatus according to another embodiment of the present invention.

As shown in FIG. 10, the laser device (not shown) may be provided so that the electrode sheets 10A (a) to (c) are irradiated with the lasers 20A (a) to (c) at the position different from the position where the back roll 41 supports the electrode sheets 10A (a) to (c). The laser device (not shown) may also be provided so that the electrode sheets 10A (a) to (c) are irradiated with the lasers 20B (a) to (c) at the position different from the position where the back roll 42 supports the electrode sheets 10A (a) to (c). In this case, even when the output of the lasers 20A (a) to (c) and the lasers 20B (a) to (c) is high, the molten resin of the insulating layers 245 (a) to (c) does not adhere to the back rolls 41 and 42. In this case, when the position of laser irradiation is too close to the back rolls 41 and 42, the molten resin may adhere to the back rolls 41 and 42 with higher probability. On the other hand, the conveyed electrode sheets 10A (a) to (c) may be floppy at the position distant from the back rolls 41 and 42. When the conveyed electrode sheets 10A (a) to (c) are floppy at the position where they are irradiated with the lasers 20A (a) to (c) and the lasers 20B (a) to (c), the electrode sheets 10A (a) to (c) may not be irradiated with the lasers 20A (a) to (c) and the lasers 20B (a) to (c) at constant positions. Therefore the electrode sheets 10A (a) to (c) may be irradiated with the lasers 20A (a) to (c) and the lasers 20B (a) to (c) at a position which is not extremely distant from the position where the back rolls 41 and 42 support the electrode sheets 10A (a) to (c). The electrode sheets 10A (a) to (c) may be irradiated with the lasers 20A (a) to (c) and the lasers 20B (a) to (c) at a position, for example, about 1 mm to 10 mm, more preferably about 1.5 mm to 8 mm distant from the position of support by the back rolls 41 and 42.

When the lasers 20A (a) to (c) and the lasers 20B (a) to (c) is irradiated at a position different from the position of support by the back rolls 41 and 42, as shown in FIG. 10, the position of irradiation of the lasers 20A (a) to (c) and the lasers 20B (a) to (c) may be moved towards downstream of the back rolls 41 and 42 (downstream, in the conveyance direction, of the electrode sheets 10A (a) to (c)). By moving the position of irradiation of the lasers 20A (a) to (c) and the lasers 20B (a) to (c) towards downstream of the back rolls 41 and 42, adherence of the molten resin to the back rolls 41 and 42 can be further securely prevented.

In the modes shown in FIGS. 9 and 10, the electrode sheets 10A (a) to (c) are irradiated with, on both side, the lasers 20A (a) to (c) and the lasers 20B (a) to (c). In this case, it is required to adjust the positions of the irradiation of the lasers 20A (a) to (c) and the lasers 20B (a) to (c) relative to the electrode sheets 10A (a) to (c) in the width direction of the electrode sheets 10A (a) to (c). This adjustment of positions may be provided by a position adjustment mechanism 62 such as an EPC device (edge position control device) or a CPC device (center position control device) (see FIG. 8). In the embodiment, the position adjustment mechanism 62 adjusts the position in the width direction of the electrode sheets 10A (a) to (c) which is supplied for laser irradiation so as to melt the insulating layers 245 (a) to (c) along lines z1, z3 and z5. In the modes shown in FIGS. 9 and 10, the position adjustment mechanism 62 may be provided prior to the back rolls 41 and 42.

Figure 11:
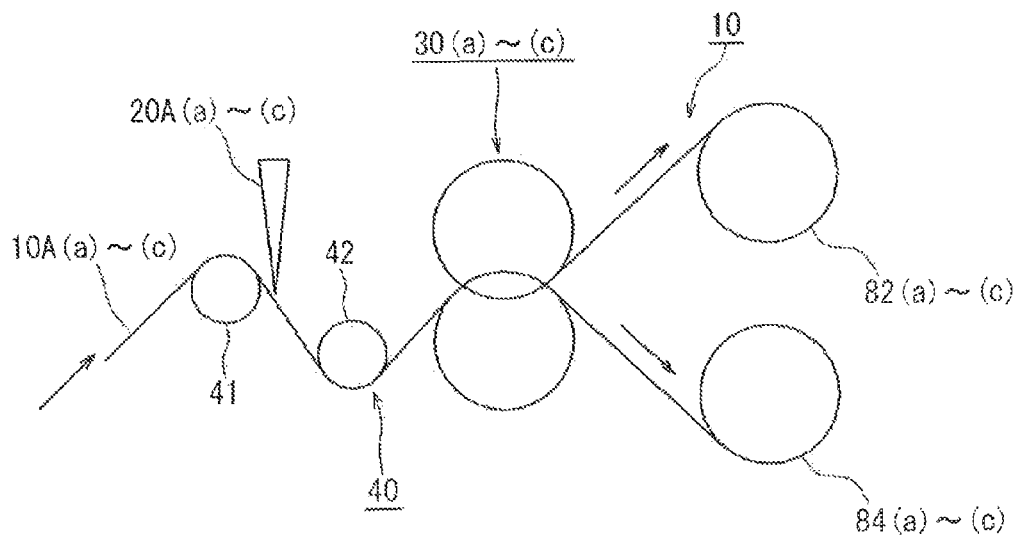
FIG. 11 is a side view showing a configuration example of an electrode sheet cutting apparatus according to another embodiment of the present invention.

When a laser is irradiated at the position different from the position of support by the back roll 41, the insulating layers 245 (a) to (c) on both sides of the electrode sheets 10A (a) to (c) may be simultaneously melted. For example, as shown in FIG. 11, a laser device (not shown) may be provided so that the electrode sheets 10A (a) to (c) are irradiated with, on one side, lasers 20A (a) to (c) at the position different from the position. of support by the back roll 41. The output of the lasers 20A (a) to (c) may also be adjusted so as to melt the insulating layers 245 (a) to (c) on both sides of the electrode sheets 10A (a) to (c). Accordingly the positions where the insulating layers 245 (a) to (c) are melted on both sides of the electrode sheets 10A (a) to (c) may easily conform.

Figure 12:
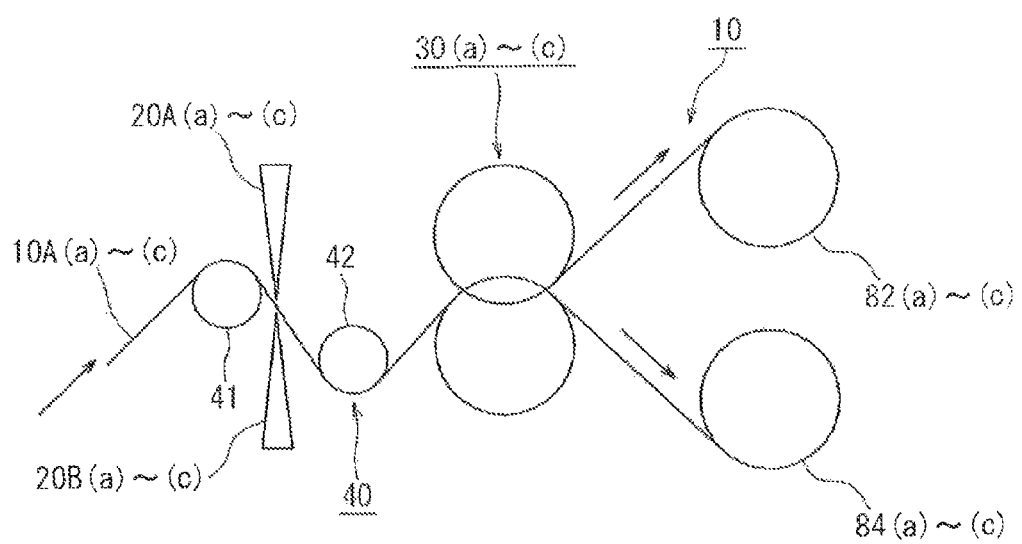
FIG. 12 is a side view showing a configuration example of an electrode sheet cutting apparatus according to another embodiment of the present invention.

Alternatively, as shown in FIG. 12, a laser device (not shown) may be provided, for example, such that the electrode sheets 10A (a) to (c) are irradiated with, on both sides, both lasers 20A (a) to (c) and lasers 20B (a) to (c) at the position different from the position of support by the back roll 41. In this case, the focus of the lasers 20A (a) to (c) and the lasers 20B (a) to (c) may be adjusted at the same position relative to the electrode sheets 10A (a) to (c) and thus the positions of irradiation of a laser on both sides of the electrode sheets 10A (a) to (c) may easily conform. In this case, similar extent of melting of the insulating layers 245 (a) to (c) may also be obtained on both sides of the electrode sheets 10A (a) to (c) by adjusting the output of the lasers 20A (a) to (c) and the lasers 20B (a) to (c).

In the step of melting, the insulating layers 245 (a) to (c) may be melted along the predetermined lines z1, z3 and z5. The insulating layers 245 (a) to (c) may be melted for a width that is desirably adjusted according to the width which the cutters 30 (a) to (c) cut in the subsequent step of cutting (Sc). Namely, when the insulating layers 245 (a) to (c) are melted, voids in the insulating layers 245 (a) to (c) are eliminated, and thus the electrolyte does not distribute in this part. Thus the insulating layers 245 (a) to (c) may be melted for a width as narrow as possible according to the width which the cutters 30 (a) to (c) cut and so as to obtain the effect of prevention of loss of resin particles and the effect of prevention of detachment of the insulating layers 245 (a) to (c). Irradiation of the laser allows adjustment of the width within, for example, about 0.1 mm to 5.0 mm by adjusting, for example, the focal distance or output power of the laser. As described above, irradiation of a laser allows easy adjustment of the position and width of melting of the insulating layers 245 (a) to (c).

In the above step of melting, a heater for heating the electrode sheets 10A (a) to (c) is exemplified by a laser device. However the heater is not limited to the laser device.

As another mode, the heater may be, for example, a hot air fan which blows hot air to the electrode sheet (not shown). In this case, hot air may have a temperature of about 300° C. and a wind velocity of 30 m/s and may be focused to the width of about 2 mm. However, hot air may not be focused to a narrow area because heat is diffused in air. Therefore it is difficult to heat only a narrow area on the electrode sheet. In addition, in this case, the insulating layers 245 (a) to (c) may easily be melted for a varied width. Therefore the melting positions may not conform on both sides of the electrode sheets 10A (a) to (c), which requires increase in the width of melting.

As another mode, the heater may include a metal roll to be pressed to the electrode sheet and a heating member to heat the metal roll (not shown). In this case, the metal roll may have a width of for example, about 2 mm and the surface temperature of about 300° C. In this case, the heated metal roll is directly pressed to the electrode sheets 10A (a) to (c) and thus the molten matter may adhere to the metal roll to cause problems. In addition, in this case, the insulating layers 245 (a) to (c) may easily be melted for a varied width. Therefore the melting positions may not conform on both sides of the electrode sheets 10A (a) to (c), which requires increase in the width of melting.

On the other hand, the method and device for irradiating the laser allows further precise adjustment of the position and width of melting of the insulating layers 245 (a) to (c) by adjusting, for example the focal distance and output of the laser. In addition, the insulating layers 245 (a) to (c) can be heated without contact to the electrode sheets 10A (a) to (c), causing decreased influence on the active material layers 243 (a) to (c). Thus the heater for heating the electrode sheets 10A (a) to (c) is suitably a laser device for irradiating the laser onto the electrode sheets 10A (a) to (c). The electrode sheets 10A (a) to (c) on which the insulating layers 245 (a) to (c) are melted along the predetermined lines z1, z3 and z5 in the step of melting are supplied to the step of cutting. The device for irradiating the laser requires a relatively small space and relatively low installation cost. The laser device may be equipped with a control system (not shown) which allows detection of the positions of the electrode sheets 10A (a) to (c) and follow-up of the laser at the position where the insulating layers 245 (a) to (c) are to be melted. Accordingly the laser can be suitably followed up to the position where the insulating layers 245 (a) to (c) are to be melted. The position and width of melting of the insulating layers 245 (a) to (c) can be further precisely adjusted in spite of floppiness and movement of the electrode sheets 10A (a) to (c).

<<Schematic View>>

Figure 13:
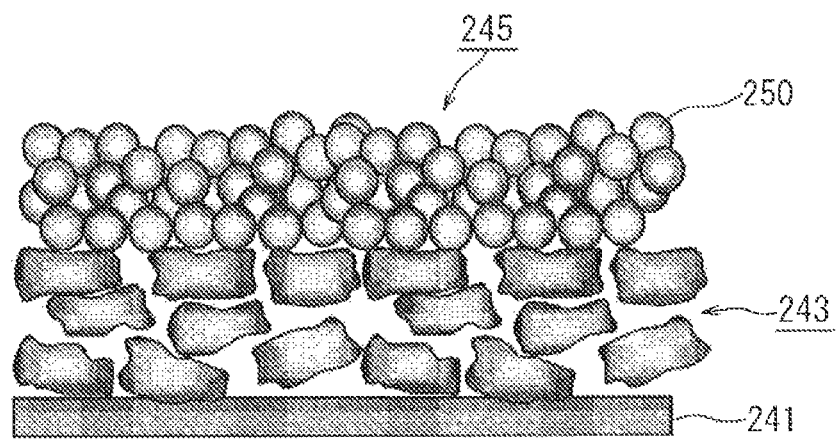
FIG. 13 is a schematic view showing the section of an electrode sheet according to one embodiment of the present invention.
Figure 14:
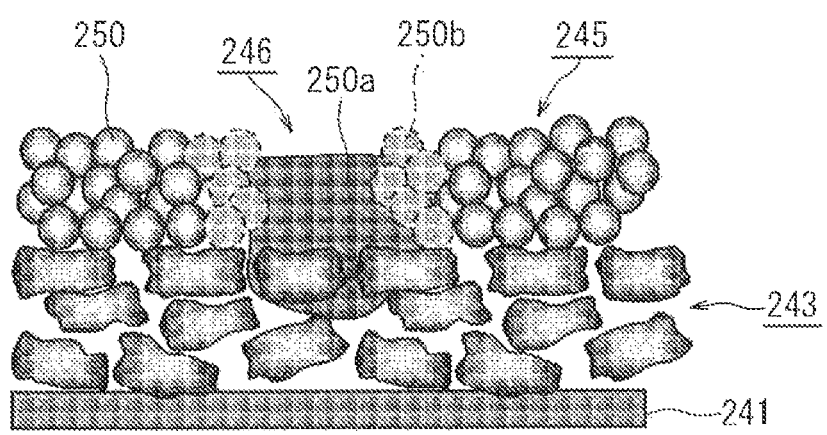
FIG. 14 is a schematic view showing the section of an electrode sheet according to one embodiment of the present invention.

FIG. 13 is a schematic view showing the status of the active material layers 243 (a) to (c) and the insulating layers 245 (a) to (c) prior to irradiation of the laser. FIG. 14 is a schematic view showing the status of the active material layers 243 (a) to (c) and the insulating layers 245 (a) to (c) after irradiation of the laser.

The insulating layers 245 (a) to (c) prior to irradiation of the laser are, as shown in FIG. 13, in the status where the resin particles 250 are approximately stacked on the active material layers 243 (a) to (c). On the other hand, the insulating layers 245 (a) to (c) after irradiation of the laser have, as shown in FIG. 14, a molten portion 250a of the resin particles 250. In this portion, a portion of the molten resin enters the voids in the active material layers 243 (a) to (c) and then is solidified, forming firm binding with the negative electrode active material layer 243. A surrounding partially molten resin 250b further binds to the surrounding resin particles 250.

As described above, when melting is carried out by irradiating the lasers 20A (a) to (c) (see FIG. 8), the resin particles in the insulating layers 245 (a) to (c) are melted. A portion of the molten resin binds to the negative electrode active material layer 243 and surrounding resin particles. Thus the molten part 246 binds with a high bonding force to the negative electrode active material layer 243 and the insulating layer 245 excluding the molten part 246. The molten part 246 is subsequently cut in the step of cutting (Sc) by cutters 30 (a) to (c). On this occasion, the edge of the thus cut insulating layer 245 is robust and thus the insulating layer 245 is less detached at the edge of the insulating layer 245. In addition, loss of resin particles from the edge of the insulating layer 245 may not occur and thus generation of foreign materials in the lithium-ion secondary battery 100 can be suppressed which is otherwise caused by loss of the resin particles at the edge of the insulating layer 245.

<<Step of Cutting (Sc)>>

The step of cutting is now described.

In the step of cutting, the electrode sheet 10A is cut along the lines z1, z3 and z5 where the insulating layers 245 (a) to (c) are melted in the step of melting. In this embodiment, the cutters 30 (a) to (c) cut the electrode sheets 10A (a) to (c). The cutters 30 (a) to (c) may be selected from various cutters (also referred to as slitters) which can suitably cut the electrode sheets 10A (a) to (c).

In this embodiment, the electrode sheets 10A (a) to (c) are, as shown in FIG. 8, strip-shaped sheets. The conveying device 40 continuously conveys the electrode sheets 10A (a) to (c) along the predetermined conveyance route. The cutters 30 (a) to (c) are fixed relative to the conveyance route of the electrode sheets 10A (a) to (c).

In the step of cutting, the position of the electrode sheets 10A (a) to (c) relative to the fixed cutters 30 (a) to (c) may be adjusted so as to cut the electrode sheet 10A along the lines z1, z3 and z5 where the insulating layers 245 (a) to (c) are melted in the step of melting. Therefore a position adjustment mechanism 64 such as an EPC device (edge position control device) or a CPC device (center position control device) is provided prior to the cutters 30 (a) to (c). The position adjustment mechanism 64 adjusts the position in the width direction of the electrode sheets 10A (a) to (c) supplied to the cutters 30 (a) to (c) so as to cut the electrode sheets 10A (a) to (c) along the lines z1, z3 and z5.

The electrode sheets 10A (a) to (c) cut by the cutters 30 (a) to (c) respectively contain the molten parts 246 (a) to (f) where the resin particles are melted on the edges of the insulating layers 245 (a) to (c). The insulating layers 245 (a) to (c) have, on the edges thereof, cut traces (not shown) resulting from cutting by the cutters 30 (a) to (c).

On the lines z1, z3 and z5 which are cut in the step of cutting, resin particles are melted in insulating layers 245 (a) to (c) on both sides in the previous step of melting. Therefore even when cutting is performed along the lines z1, z3 and z5, loss of the resin particles does not occur substantially. On these lines z1, z3 and z5, the molten resin firmly adheres to the active material layers 243 (a) to (c). Therefore even when cutting is performed along the lines z1, z3 and z5 in the step of cutting, the insulating layers 245 (a) to (c) are not substantially detached.

In this embodiment, the electrode sheets 10A (a) to (c) which have been cut by the cutters 30 (a) to (c) may be, for example, as shown in FIGS. 9 to 12, wound up to different winding axes 82 (a) to (c) and 84 (a) to (c).

According to the method for producing the secondary battery as described above, the insulating layers 245 (a) to (c) are melted at the portions to be cut prior to cutting of the electrode sheets 10A (a) to (c). Thus the loss of resin particles from the insulating layers 245 (a) to (c) and the partial detachment of the insulating layers 245 (a) to (c) may not occur in the step of cutting.

In this case, the insulating layers 245 (a) to (c) may be melted in the step of melting, as shown in FIG. 8, by irradiating the lasers 20A (a) to (c) onto the insulating layers 245 (a) to (c). The method and device for irradiating the laser allows further precise adjustment of the position and width of melting of the insulating layers 245 (a) to (c) by adjusting, for example, the focal distance and output of the laser. Therefore the width for melting can be appropriately narrowed depending on the width which the cutters 30 (a) to (c) cut.

The electrode sheet cutting apparatus may comprise a heater (a laser device in the above embodiment) and cutters 30 (a) to (c). The heater may be provided so as to heat the electrode sheets 10A (a) to (c) along the predetermined lines z1, z3 and z5. The cutters 30 (a) to (c) are provided so as to be able to cut the electrode sheets 10A (a) to (c) along the lines z1, z3 and z5 where the insulating layers 245 (a) to (c) are melted. The electrode sheet cutting apparatus can cut the insulating layers 245 (a) to (c) after melting thereof in the step of cutting the electrode sheets 10A (a) to (c) having the insulating layers 245 (a) to (c) containing stacked resin particles.

In this case, as shown in FIGS. 8 and 9, the conveying device 40 may be provided which conveys the electrode sheets 10A (a) to (c) along the predetermined conveyance route. In this case, the heater (laser device) and the cutters 30 (a) to (c) may be fixed along the conveyance route. Position adjustment mechanisms 62 and 64 may also be provided which adjust the positions of the electrode sheets 10A (a) to (c) relative to the heater (laser device) and the cutters 30 (a) to (c). In this case, the position adjustment mechanisms 62 and 64 appropriately convey the electrode sheets 10A (a) to (c). This allows the electrode sheets 10A (a) to (c) to be melted and cut at appropriate positions.

When the electrode sheets 10A (a) to (c) are strip-shaped sheets as in the above embodiment, the conveying device 40 may continuously convey the electrode sheets 10A (a) to (c) along the conveyance route. This allows the electrode sheets 10A (a) to (c) to be continuously melted and cut along the lines z1, z3 and z5, resulting in effective production of electrode sheets.

The conveying device 40 may also include a plurality of guide rolls 41 and 42 which support and convey the electrode sheets 10A (a) to (c). In this case, the heater (laser device irradiating lasers 20A (a) to (c)) may be provided so that the electrode sheets 10A (a) to (c) are heated at the position downstream, in the conveyance direction, of the position where the guide rolls 41 and 42 support the electrode sheets 10A (a) to (c). This results in less adherence of the molten resin on the guide rolls 41 and 42. In this case, the insulating layers 245 (a) to (c) on both sides of the electrode sheets 10A (a) to (c) can be simultaneously melted. Accordingly, the positions of melting of the insulating layers 245 (a) to (c) on both sides of the electrode sheets 10A (a) to (c) may easily conform.

Figure 15:
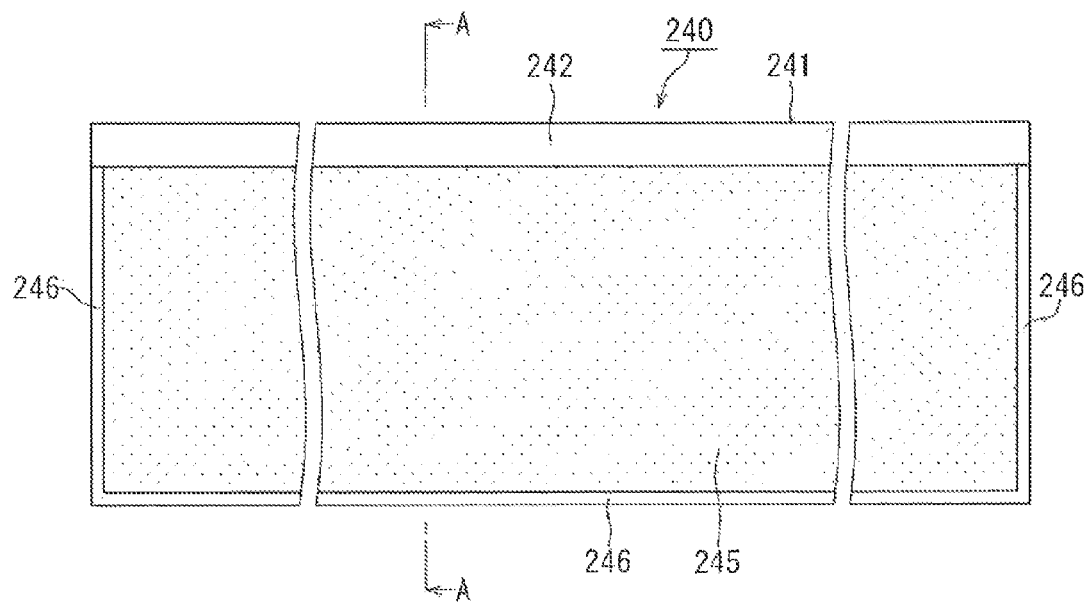
FIG. 15 is a plan view of an electrode sheet according to one embodiment of the present invention.
Figure 16:
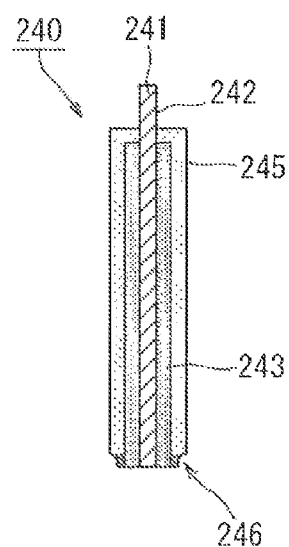
FIG. 16 is a section view showing the section along A-A of FIG. 15.

In the above example described, the electrode sheets 10A (a) to (c) are strip-shaped sheets and the electrode sheets 10A (a) to (c) are cut in the length direction while they are conveyed. In this case, as shown in FIG. 15, the electrode sheets 10A (a) to (c) are further cut so as to have a predetermined length. When an edge is cut in the length direction, the resin particles in the insulating layer 245 may be melted and then cut at the cutting position. This allows prevention of loss of the resin particles and partial detachment of the insulating layer 245 at the edge thereof. FIG. 16 is a section view along A-A of FIG. 15.

Figure 17:
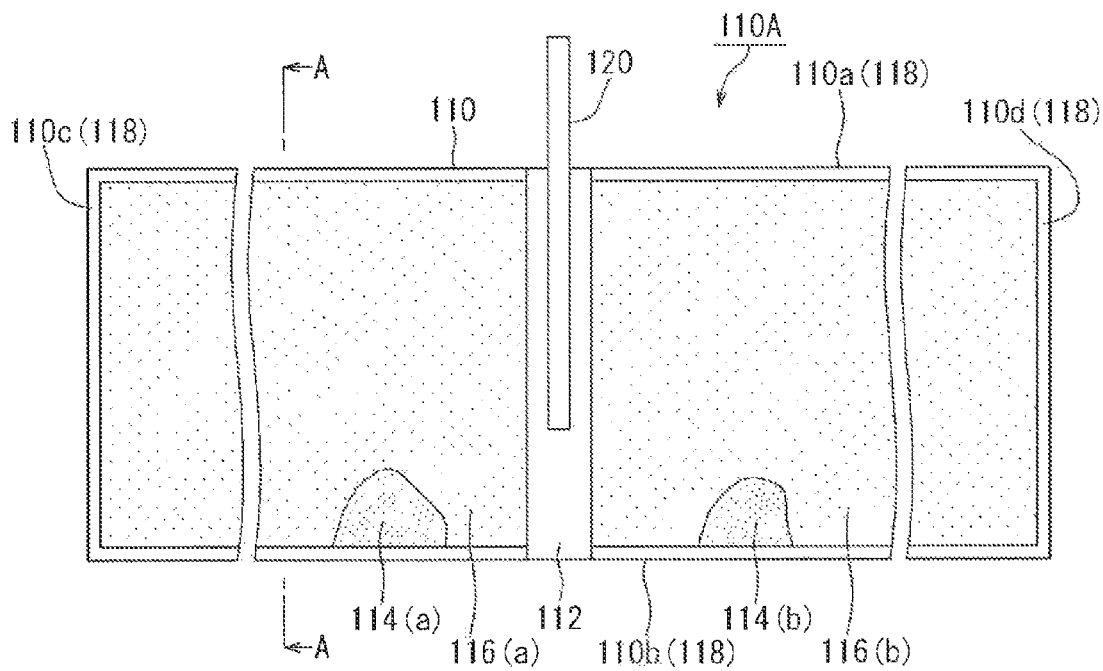
FIG. 17 is a plan view of an electrode sheet according to another embodiment of the present invention.
Figure 18:
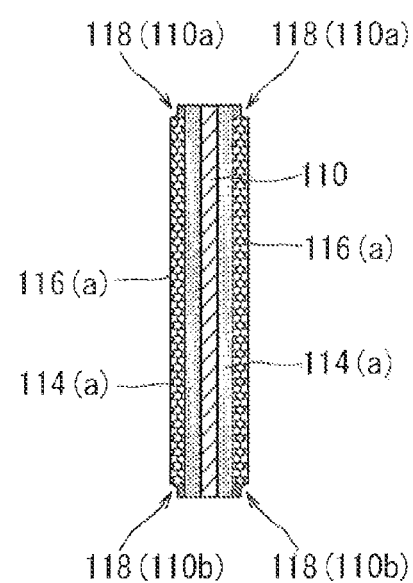
FIG. 18 is a section view showing the section along A-A of FIG. 17.

In the above embodiment described, the electrode sheet is a strip-shaped sheet and the uncoated part 242 is defined along one edge in the width direction. However, electrode sheets may have various structures according to the structures of secondary batteries. For example, as another mode of the electrode sheet, an electrode sheet 110A shown in FIG. 17 has an uncoated part 112 in the middle of a strip-shaped current collector 110 in the length direction and active material layers 114 (a) and (b) on both sides thereof. According to this mode, a tab 120 (a foil for harvesting electricity) can be attached to the uncoated part 112 formed in the middle of the current collector 110 in the length direction. This is also referred to as a center tab. In this mode, insulating layers 116 (a) and (b) are further formed so as to cover the active material layers 114 (a) and (b) formed on both sides of the uncoated part 112. FIG. 18 is a section view showing the section along A-A of FIG. 17.

Figure 19:
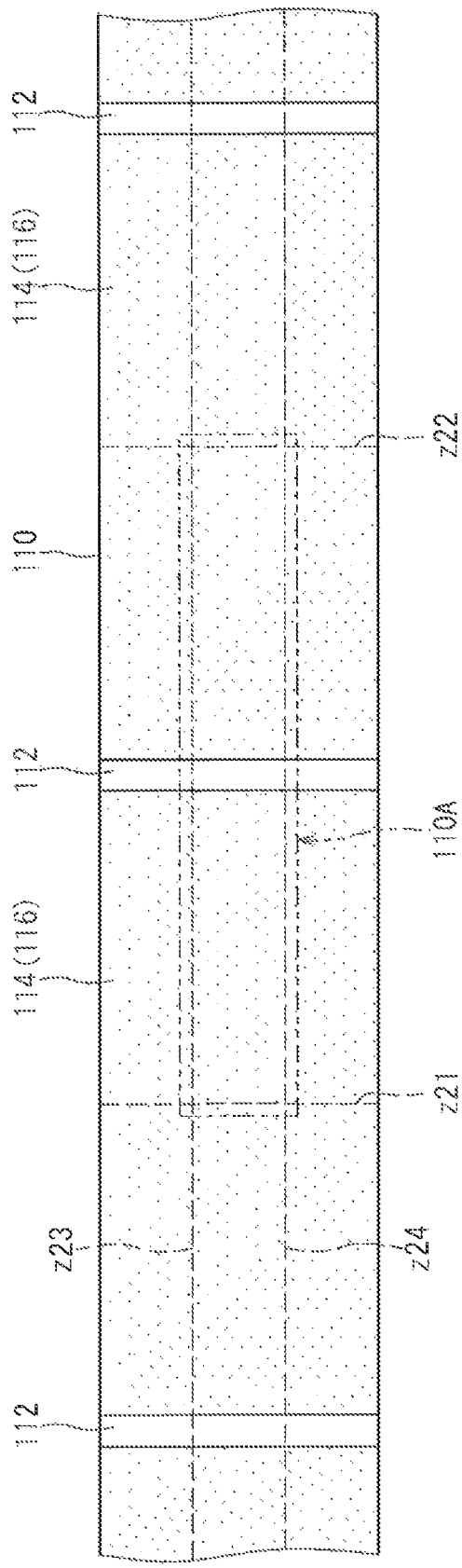
FIG. 19 is a view showing a mother sheet from which the electrode sheet shown in FIG. 17 is excised.

In this mode, as shown in FIG. 19, a strip-shaped current collector 110 (mother current collector) having a broad width is prepared, an active material layer 114 is formed thereon intermittently and an insulating layer 116 is formed so as to cover the active material layer 114. As shown in FIG. 19 with broken lines, cutting lines z21 and z22 are defined between an uncoated part 112 and an uncoated part 112. Cutting lines z23 and z24 are further defined along the length direction of the current collector 110 with intervals in the width direction of the current collector 110. An electrode sheet 110A is excised along the cutting lines z21 to z24. When the cutting lines z21 to z24 are cut, the insulating layer 116 may be melted along the cutting lines z21 to z24 prior to cutting. Accordingly, as shown in FIG. 17, the electrode sheet 110A is excised which has a molten part 118 formed on both edges 110a and 110b in the width direction and both edges 110c and 110d in the length direction of the electrode sheet 110A.

Figure 20:
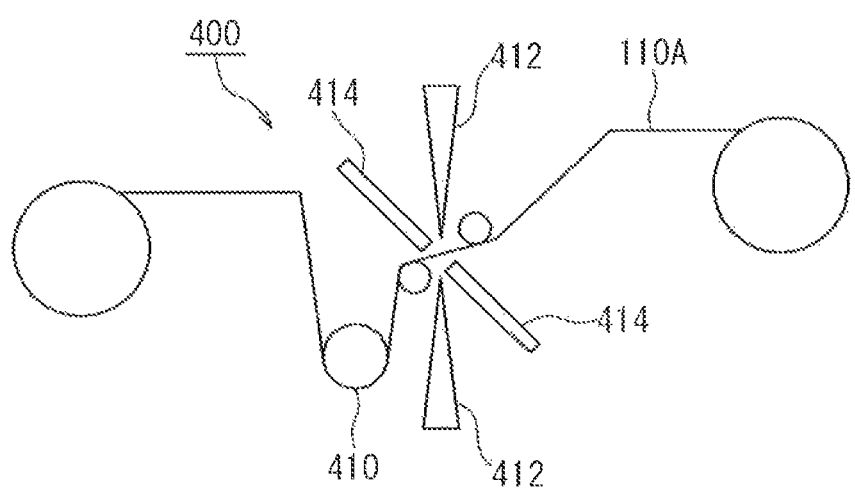
FIG. 20 is a side view showing a configuration example of an electrode sheet cutting apparatus according to one embodiment of the present invention.

When both edges 110c and 110d in the length direction of the electrode sheet 110A are cut, for example, a winding device 400 for producing the wound electrode assembly 200 may contain, in the proximity of a winding axis 410, a laser 412 for melting the insulating layer 116 and a cutter 414 for cutting the molten site, as shown in FIG. 20.

As described above, the electrode sheet 110A is not limited to the above embodiments and may be in various modes. Regardless of its configuration, when the electrode sheet 110A has, as shown in FIG. 18 for example, the insulating layer 116 of the stacked resin particles formed so as to cover the active material layer 114, the insulating layer 116 may be melted prior to cutting at the position where the insulating layer 116 is formed. This allows prevention of loss of the resin particles from the insulating layer 116 and partial detachment of the insulating layer 116 at the edge thereof. As described above, the means for melting the insulating layer 116 may be irradiation of a laser onto the insulating layer 116, which may suitably be a $CO_2$ laser.

Modified examples of the method for producing the secondary battery and the electrode sheet cutting apparatus are hereinafter described.

In the embodiment described above, the position of the insulating layers 245 (a) to (c) where they are melted by the heater (laser device irradiating lasers 20A (a) to (c) or lasers 20B (a) to (c)) is distant from the position of the electrode sheets 10A (a) to (c) where they are cut. Because of this, the temperature of the electrode sheets 10A (a) to (c) may decrease while they travel this distance, allowing sufficient solidification of the resin melted in the step of melting before cutting of the electrode sheets 10A (a) to (c). In this case, the traveling between the melting position of the insulating layers 245 (a) to (c) and the cutting position of the electrode sheets 10A (a) to (c) may be performed for at least 0.5 seconds or more and more preferably 0.8 seconds or more at normal temperature (about 25° C.).

<<Step of Cooling>>

Figure 21:
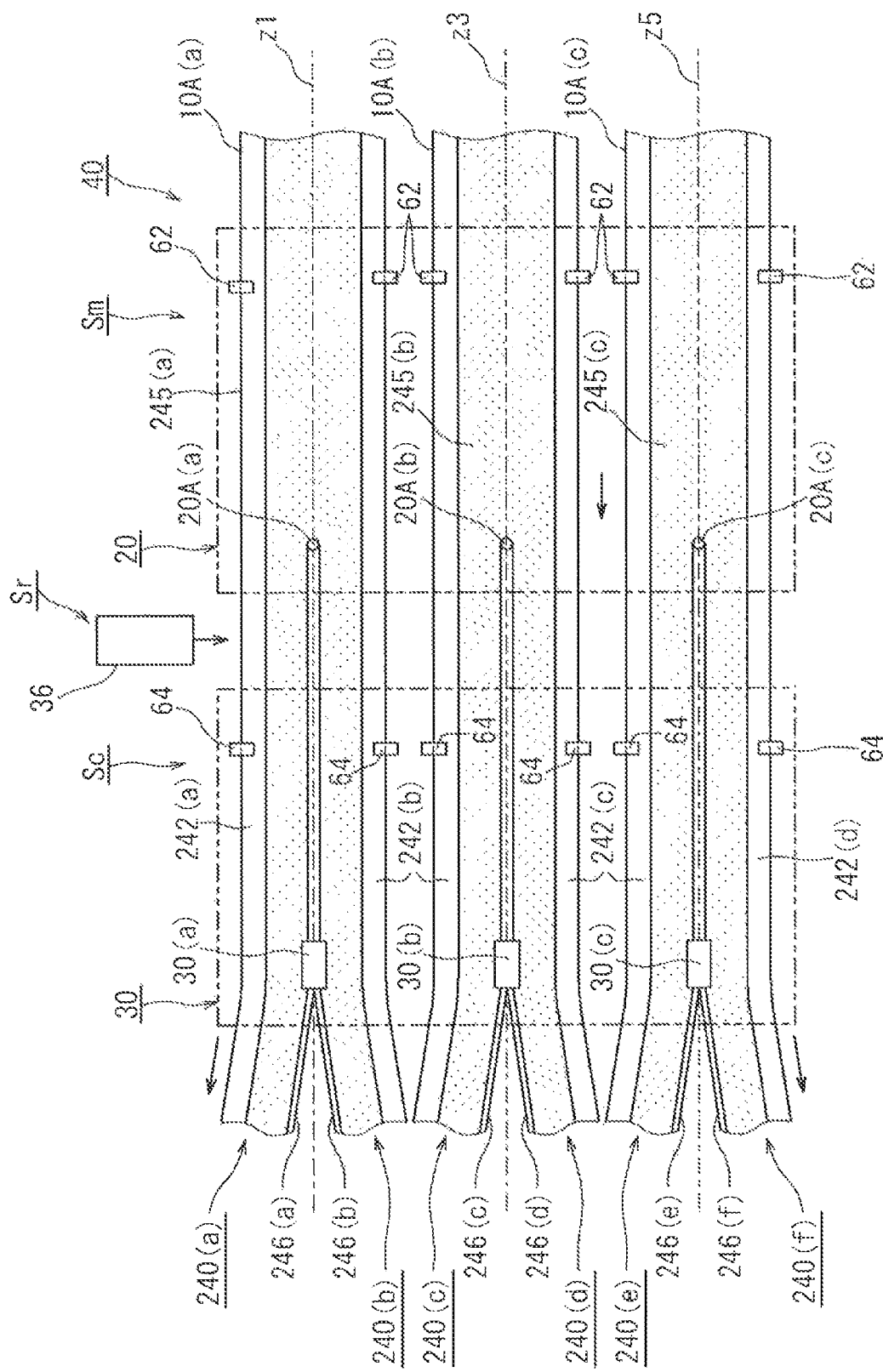
FIG. 21 is a plan view showing the step of cooling in the method for producing a secondary battery according to another embodiment of the present invention.

If the resin melted in the step of melting is subjected to the step of cutting before sufficient solidification, troubles may be caused such that the resin adheres to the cutters 30 (a) to (c). On the other hand, in order to secure enough interval between the step of melting and the step of cutting, the takt time is increased. Thus the method for producing the secondary battery may comprise, for example, as shown in FIG. 21, the step of cooling (Sr) the electrode sheet between the step of melting (Sm) and the step of cutting (Sc). Inclusion of the step of cooling (Sr) the electrode sheet between the step of melting (Sm) and the step of cutting (Sc) further ensures solidification of the resin melted in the step of melting before the step of cutting. Accordingly the takt time between the step of melting and the step of cutting can be reduced.

<<Cooling Device>>

For example, in the mode shown in FIG. 21, a cooling device 36 is provided which cools electrode sheets 10A (a) to (c) after heating by a heater (laser device irradiating lasers 20A (a) to (c) or lasers 20B (a) to (c)) and before cutting by cutters 30 (a) to (c). In this embodiment, the electrode sheets 10A (a) to (c) are strip-shaped sheets and a conveying device 40 continuously conveys the electrode sheets 10A (a) to (c) along a conveyance route. The cooling device 36 is provided along the conveyance route between the heater (laser device irradiating lasers 20A (a) to (c) or lasers 20B (a) to (c)) and the cutters 30 (a) to (c). The cooling device 36 may be, for example, a fan blowing air towards the electrode sheets 10A (a) to (c). In this case, the electrode sheets 10A (a) to (c) can be cooled without contact.

<<Other Modes of Cooling Device>>

Figure 22:
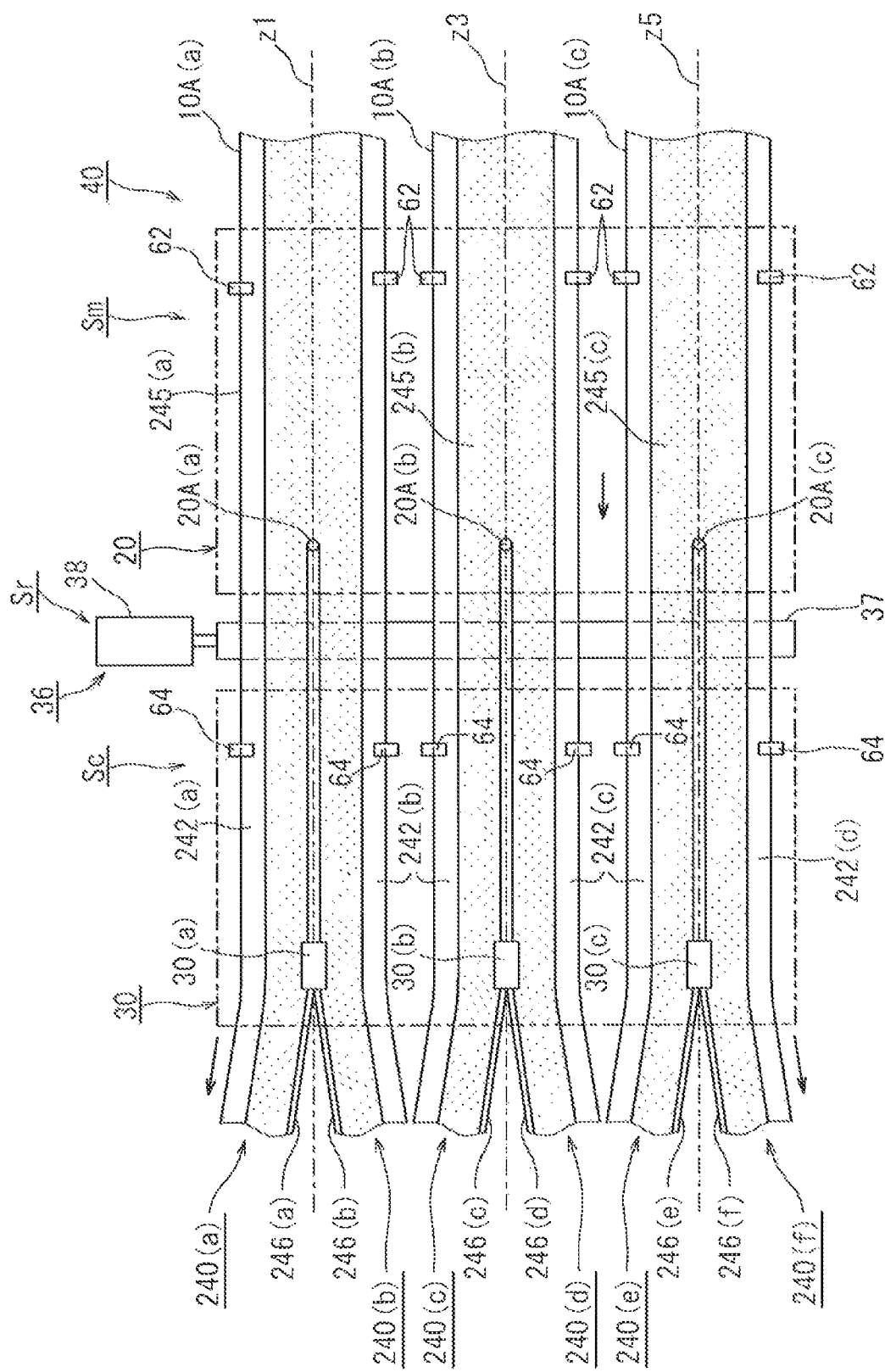
FIG. 22 is a plan view showing the step of cooling in the method for producing a secondary battery according to another embodiment of the present invention.

Alternatively, the cooling device 36 may include, as shown in FIG. 22, a metal roll 37 to be pressed to the electrode sheets 10A (a) to (c) and a cooling member 38 which cools the metal roll 37. The cooling member 38 may cool the metal roll 37 at the position where the metal roll 37 is not pressed to the electrode sheets 10A (a) to (c). The cooling member 38 may have a heat absorbing structure from the metal roll 37. The cooling member 38 may have a structure which applies cool air to the metal roll 37 at the position where the metal roll 37 is not pressed to the electrode sheets 10A (a) to (c). The cooling member 38 may have a structure in which a cooling media is circulated in the metal roll 37 having a hollow structure. In this case, rapid cooling of the electrode sheets 10A (a) to (c) is possible, resulting in reduced takt time.

In the above embodiment, the lithium-ion secondary battery 100 has, for example as shown in FIGS. 1 to 3, has the positive electrode active material layer 223 having a broader width than the negative electrode active material layer 243. Further the negative electrode active material layer 243 is provided so as to oppose the positive electrode active material layer 223. The insulating layer 245 covers the negative electrode active material layer 243 of the negative electrode sheet 240. Accordingly lithium ions (Li) released from the positive electrode active material layer 223 are easily absorbed to the negative electrode active material layer 243 and are stably transferred back and forth between the positive electrode active material layer 223 and the negative electrode active material layer 243. However, this does not limit and the insulating layer 245 may be formed so as to cover the positive electrode active material layer 223 or may be provided for both positive electrode active material layer 223 and negative electrode active material layer 243. Thus the insulating layer 245 may be provided for any of the positive electrode active material layer 223 and the negative electrode active material layer 243.

The configuration of the secondary battery is not limited to those shown in FIGS. 1 to 3. For example in the above embodiment, the insulating layer 245 acts as a separator, so that no additional separator is provided. The configuration of the secondary battery is not limited to this and, in addition to provision of the insulating layer 245 for at least one of the positive electrode active material layer 223 and the negative electrode active material layer 243, an additional separator may be provided between the positive electrode sheet 220 and the negative electrode sheet 240. As described above, the secondary battery according to one embodiment of the present invention has the molten part 246 where the resin particles are melted at the edge of the insulating layer 245. In such a secondary battery, as described above, detachment of the insulating layer 245 at the edge of the insulating layer 245 is prevented because the molten part 246 is formed where the resin particles are melted at the edge of the insulating layer 245, providing high safety. When the additional separator is additionally provided between the positive electrode sheet 220 and the negative electrode sheet 240, further improved safety may be provided.

<<Other Modes of Insulating Layer>>

The insulating layer 245 contains, for example, the stacked resin particles as described above which melt at a predetermined temperature at the time of abnormally increased temperature in the battery and form a film that blocks the distribution of an electrolyte on the surface of the negative electrode active material layer 243. Accordingly the reactions in the battery can be halted. The insulating layer 245 may be formed at a predetermined thickness (e.g. thickness of about 20 μm to 40 μm) on either side of the negative electrode sheet 240.

Thus in this embodiment the insulating layer 245 is a porous layer containing the stacked resin particles having insulating properties. The insulating layer 245 may concomitantly contain, in addition to the resin particles, particles having insulating properties at the amount (e.g. 50 wt % or less, more suitably 40 wt % or less) that does not prevent the shut down function of the insulating layer 245. The particles which may be concomitantly contained in the insulating layer 245 may be, for example, an inorganic filler or rubber particles having insulating properties.

The inorganic filler preferably has resistance against abnormal heat generation of the lithium-ion secondary battery and is electrochemically stable within the usage of the battery. The inorganic filler may contain metal oxide particles or other metal compound particles. The inorganic filler may be exemplified by alumina ($Al_2O_3$), alumina hydrate (e.g. boehmite ($Al_2O_3 \cdot H_2O$)), zirconia ($ZrO_2$), magnesia (MgO). aluminium hydroxide ($Al(OH)_3$), magnesium hydroxide ($Mg(OH)_2$), magnesium carbonate ($MgCO_3$) and the like. The inorganic filler which may be contained in the insulating layer 245 may be one or two or more inorganic fillers as described above. When the insulating layer 245 contains rubber particles, one or two or more types of rubber particles may be added.

Among these, when the insulating layer 245 contains the inorganic filler having insulating properties, the insulating layer 245 has improved heat resistance. In this case, the inorganic filler may have a particle diameter of, for example, about 0.1 μm to 6 μm and more preferably about 0.5 μm to 4 μm. When the inorganic filler having insulating properties is admixed, the inorganic filler in the insulating layer 245 does not melt and remains even when the resin particles are melted at abnormally increased temperature in the battery. The inorganic filler can prevent direct contact between the positive electrode active material layer 223 and the negative electrode active material layer 243 and the heat resistance of the insulating layer 245 can be improved. In order to exhibit such a function, the inorganic filler having insulating properties may be contained, for example, 5 wt % or more, preferably 10 wt % or more and more preferably 15 wt % or more in the insulating layer 245. The insulating layer 245 may be added with only the inorganic filler or only rubber particles. The insulating layer 245 may alternatively contain both inorganic filler and rubber particles.

In the example shown in FIG. 6, the active material layers 243 (a) to (c) are in three rows, so as to allow six negative electrode sheets 240 to be excised. However, this example shown in FIG. 6 is an example and does not provide any limitation. More simply, as shown in FIG. 8, an active material layer 243 may be formed at the center in the width direction of a current collector 10 having the width for two electrode sheets and an insulating layer 245 may be formed so as to cover the active material layer 243. A simple mode is such that, for example, an active material layer 243 may be formed at the center in the width direction of a current collector 10 having the width for two electrode sheets (negative electrode sheets 240) and an insulating layer 245 may be formed so as to cover the active material layer 243.

<<Other Modes of Batteries>>

The aforementioned is an example of the lithium-ion secondary battery. The lithium-ion secondary battery is not limited to the above mode. An electrode sheet which contains an electrode mixture applied on a metal foil in a similar manner may be used for other various modes of batteries. Other known modes of batteries include, for example, cylindrical batteries, laminated batteries and the like. The cylindrical batteries contain wound electrode assemblies harbored in cylindrical battery cases. The laminated batteries contain positive electrode sheets and negative electrode sheets laminated with separators existing therebetween.

The method for producing the secondary battery and the electrode sheet cutting apparatus described above can be widely applied to the step of cutting an electrode sheet which contains an insulating layer containing stacked resin particles formed so as to cover an active material layer of the electrode sheet as described above. In the above embodiment, the electrode sheets 10A (a) to (c) are strip-shaped sheets. However, the electrode sheet may not be strip-shaped sheets. For example, for laminated secondary batteries, a plurality of electrode sheets having a predetermined shape is prepared. The mother sheet for the electrode sheets may not be necessarily strip-shaped in this case.

The secondary battery, the method for producing the secondary battery and the electrode sheet cutting apparatus according to the embodiments have been described hereinabove. The present invention however is not limited to any embodiments described above unless otherwise stated.

Figure 23:
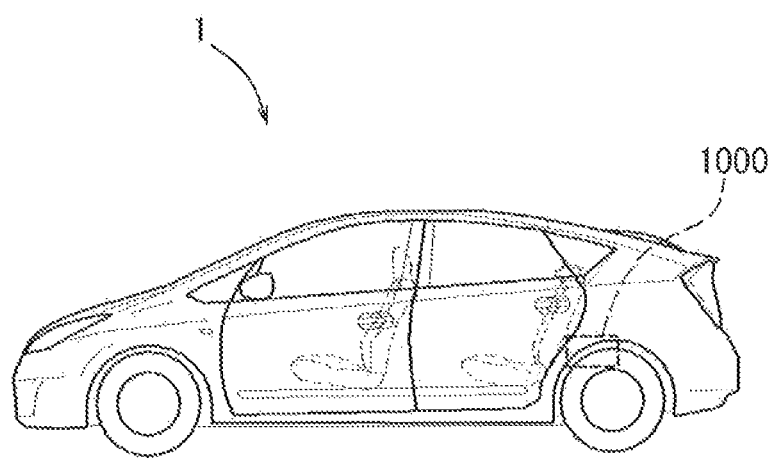
FIG. 23 is a view showing a vehicle comprising a lithium-ion secondary battery.

As described above, the method for producing the secondary battery and the electrode sheet cutting apparatus can be widely applied to the step of cutting an electrode sheet which contains an insulating layer containing stacked resin particles formed so as to cover an active material layer. The method for producing the secondary battery and the electrode sheet cutting apparatus may prevent generation of foreign materials due to loss of the resin particles and detachment of the insulating layer. Thus they contribute to improvement in reliability of the secondary battery which contains an insulating layer containing stacked resin particles formed so as to cover an active material layer. Thus they can be particularly suitably applied to the secondary batteries for vehicles such as hybrid vehicles and electric vehicles which are required to have high output characteristics and stable performances. Namely, the secondary battery according to one embodiment of the present invention may be, as shown in FIG. 23, suitably used as a battery 1000 (vehicle driving battery) for driving a motor (electric motor drive) of a vehicle 1 such as an automobile. The vehicle driving battery 1000 may be an assembled battery containing a plurality of secondary batteries.

REFERENCE SIGNS LIST

10 Current collector
10A Electrode sheet
20 Heater
20A Laser
20B Laser
30 Cutter
36 Cooling device
37 Metal roll
38 Cooling member
40 Conveying device
41, 42 Guide roll (back roll)
62, 64 Position adjustment mechanism
82, 84 Winding axis
100 Lithium-ion secondary battery (secondary battery)
110 Current collector
110A Electrode sheet
110a, 110b, 110c, 110d Edge of electrode sheet
112 Uncoated part
114 Active material layer
116 Insulating layer
118 Molten part
120 Tab
200 Wound electrode assembly
220 Positive electrode sheet
221 Positive electrode current collector
222 Uncoated part
223 Positive electrode active material layer
240 Negative electrode sheet
241 Negative electrode current collector
242 Uncoated part
243 Active material layer
243 Negative electrode active material layer
245 Insulating layer
246 Molten part
250 Resin particle
250a Molten portion of resin particle 250
250b Partially molten resin
280 Electrolyte
290 Charger
300 Battery case
310 Gap
320 Case body
322 Joining part of lid 340 and ease body 320
340 Lid
360 Safety valve
400 Winding device
410 Winding axis
412 Laser
414 Cutter
420 Electrode terminal
440 Electrode terminal
1000 Vehicle driving battery (secondary battery)
z1 to z5 Line (cutting line)
z21 to z24 Line (cutting line)
Sm Step of melting
Sc Step of cutting
Sf Step of cooling

The invention claimed is:

1. A method for producing a secondary battery comprising: preparing an electrode sheet including a current collector, an active material layer formed on the surface of the current collector and containing an electrode active material, and a porous insulating layer, containing stacked resin particles of insulation, formed so as to cover the active material layer; melting the resin particles in the insulating layer of the electrode sheet, along a predetermined line; and cutting the electrode sheet along the predetermined line upon the resin particles being solidified.

2. The method for producing a secondary battery according to claim 1, wherein in the melting, the resin particles in the insulating layer are melted by irradiating a laser onto the insulating layer.

3. The method for producing a secondary battery according to claim 2, wherein the laser is a $CO_2$ laser.

4. The method for producing a secondary battery according to claim 1, further comprising cooling the electrode sheet between the melting and the cutting.

5. A method for producing a secondary battery comprising: preparing an electrode sheet including a current collector, an active material layer formed on the surface of the current collector and containing an electrode active material, and a porous insulating layer, containing stacked resin particles of insulation, formed so as to cover the active material layer; melting the resin particles in the insulating layer of the electrode sheet, along a predetermined line; and cutting the electrode sheet along the predetermined line upon the resin particles, being solidified, wherein the electrode sheet contains, in the insulating layer, an inorganic filler having insulating properties.

6. A method for producing a secondary battery, comprising: preparing an electrode sheet including a current collector, an active material layer formed on the surface of the current collector and containing an electrode active material, and a porous insulating layer, containing stacked resin particles of insulation, formed so as to cover the active material layer; melting the resin particles in the insulating layer of the electrode sheet, along a predetermined line; and cutting the electrode sheet along the predetermined line upon the resin particles, being solidified, wherein the electrode sheet contains, in the insulating layer, rubber particles having insulating properties.

* * * * *